US007224557B2

(12) United States Patent
Kinsella et al.

(10) Patent No.: US 7,224,557 B2
(45) Date of Patent: May 29, 2007

(54) METHOD AND SYSTEM OF CONTROLLING ASYNCHRONOUS CONTACTORS FOR A MULTI-PHASE ELECTRIC LOAD

(75) Inventors: James J. Kinsella, Pleasant View, TN (US); Peter J. Unsworth, Lewes (GB); Xin Zhou, Brookfield, WI (US); Christopher J. Wieloch, Brookfield, WI (US); Michael T. Little, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 609 days.

(21) Appl. No.: 10/859,507

(22) Filed: Jun. 2, 2004
(Under 37 CFR 1.47)

(65) Prior Publication Data

US 2005/0013085 A1    Jan. 20, 2005

Related U.S. Application Data

(60) Provisional application No. 60/483,554, filed on Jun. 28, 2003.

(51) Int. Cl.
*H02H 3/08* (2006.01)
(52) U.S. Cl. .................. 361/2; 361/6; 361/23; 361/30; 361/31; 361/33; 361/54; 361/56
(58) Field of Classification Search .................. 361/2, 361/6, 23, 30, 31, 33, 54, 56
See application file for complete search history.

(56) References Cited

U.S. PATENT DOCUMENTS

| 3,624,471 | A | 11/1971 | Japp et al. |
| 3,934,110 | A | 1/1976 | Denis |
| 3,982,137 | A | 9/1976 | Penrod |
| 4,019,017 | A | 4/1977 | Sitek et al. |
| 4,056,836 | A | 11/1977 | Knauer |
| 4,070,605 | A * | 1/1978 | Hoeppner .................... 318/758 |
| 4,128,749 | A | 12/1978 | Spaderna |
| 4,268,787 | A | 5/1981 | Sloan |
| 4,354,215 | A | 10/1982 | van der Scheer |
| 4,398,097 | A | 8/1983 | Schell et al. |
| 4,445,018 | A | 4/1984 | Holmgren |
| 4,491,708 | A | 1/1985 | O'Leary et al. |

(Continued)

FOREIGN PATENT DOCUMENTS

DE    4224620 C1    3/1994

(Continued)

*Primary Examiner*—Rita Leykin
(74) *Attorney, Agent, or Firm*—Ziolkowski Patent Solutions Group, SC

(57) ABSTRACT

Control of an induction motor is carried out to limit damaging arcing stress and mechanical stresses placed on the control contactor assembly and the induction motor resulting from the simultaneous or synchronous breaking and making of contactors employed to connect the windings of the motor to a power supply. Asynchronously connecting the windings to the power supply via the asynchronous or non-simultaneous closing of the contactors of a modular contactor assembly reduces the potentially damaging transient current, the associated torque oscillations, and mechanical stresses. The present invention is particularly applicable to delta motors that are started with its windings in a star or wye configuration followed by the reconnection of the windings in a delta configuration when the motor is at normal running speed.

25 Claims, 32 Drawing Sheets

U.S. PATENT DOCUMENTS

| | | |
|---|---|---|
| 4,525,762 A | 6/1985 | Norris |
| 4,642,481 A | 2/1987 | Bielinski et al. |
| 4,864,157 A * | 9/1989 | Dickey .................. 307/135 |
| 4,959,746 A | 9/1990 | Hongel |
| 5,493,091 A | 2/1996 | Devautour et al. |
| 5,514,844 A | 5/1996 | Hamano et al. |
| 5,808,851 A * | 9/1998 | Birrell .................. 361/187 |
| 5,933,304 A * | 8/1999 | Irissou .................... 361/8 |
| 5,959,517 A | 9/1999 | Wieloch et al. |
| 6,025,693 A * | 2/2000 | Smith .................... 318/768 |
| 6,087,800 A | 7/2000 | Becker et al. |
| 6,377,143 B1 | 4/2002 | Zhou et al. |
| 6,956,728 B2 * | 10/2005 | Zhou et al. .............. 361/160 |
| 7,057,311 B1 * | 6/2006 | Zhou et al. .............. 307/131 |
| 2002/0093774 A1 * | 7/2002 | Chung ...................... 361/2 |
| 2003/0223738 A1 * | 12/2003 | Hughes et al. ............ 388/800 |

FOREIGN PATENT DOCUMENTS

| | | |
|---|---|---|
| GB | 2303005 A | 5/1997 |

* cited by examiner

METHOD AND SYSTEM OF CONTROLLING ASYNCHRONOUS CONTACTORS FOR A MULTI-PHASE ELECTRIC LOAD

CROSS-REFERENCE TO RELATED APPLICATIONS

The present invention claims the benefit of U.S. Ser. No. 60/483,554, filed Jun. 28, 2003.

BACKGROUND OF THE INVENTION

The present invention relates generally to an electrical switching device, and more particularly, to a method and apparatus of asynchronously controlling contactors to reduce mechanical stresses on an induction motor during transition between modes of operation.

Typically, contactors are used in starter applications to switch on/off a load as well as to protect a load, such as a motor, or other electrical devices from current overloading. As such, a typical contactor will have three contact assemblies; a contact assembly for each phase or pole of a three-phase electrical device. Each contact assembly typically includes a pair of stationary contacts and a moveable contact. One stationary contact will be a line side contact and the other stationary contact will be a load side contact. The moveable contact is controlled by an actuating assembly comprising an armature and magnet assembly which is energized by a coil to move the moveable contact to form a bridge between the stationary contacts. When the moveable contact is engaged with both stationary contacts, current is allowed to travel from the power source or line to the load or electrical device. When the moveable contact is separated from the stationary contacts, an open circuit is created and the line and load are electrically isolated from one another.

Generally, a single coil is used to operate a common carrier for all three contact assemblies. As a result, the contactor is constructed such that whenever a fault condition or switch open command is received in any one pole or phase of the three-phase input, all the contact assemblies of the contactor are opened in unison. Similarly, when a closed circuit or conducting condition is desired, all the contact assemblies are controlled to close in unison. Simply, the contact assemblies are controlled as a group as opposed to being independently controlled.

This contactor construction has some drawbacks, particularly in high power motor starter applications. Since there is a contact assembly for each phase of the three-phase input, the contact elements of the contact assembly must be able to withstand high current conditions or risk being weld together under fault (high current) or abnormal switching conditions. The contacts must therefore be fabricated from composite materials that resist welding. These composite materials can be expensive and contribute to increased manufacturing costs of the contactor. Other contactors have been designed with complex biasing mechanisms to regulate "blow open" of the contacts under variable fault conditions, but the biasing mechanisms also add to the complexity and cost of the contactor. Alternately, to improve contact element resistance to welding without implementation of more costly composites can require larger contact elements. Larger contacts provide greater heat sinking and current carrying capacity. Increasing the size of the contact elements, however, requires larger actuating mechanisms, coils, biasing springs, and the like, which all lead to increased product size and increased manufacturing costs.

Additionally, a contactor wherein all the contact assemblies open in unison can result in contact erosion as a result of arcs forming between the contacts during breaking. When all the contact assemblies or sets of contacts are controlled in unison, a detected abnormal condition, such as a fault condition, in any phase of the three-phase input causes all the contact assemblies to break open because the contact assemblies share a bridge or crossbar. Therefore, breaking open of the contacts of one contact assembly causes the contacts of the other contact assemblies to also open. As a result, the contacts may open at non-ideal current conditions. For example, the contactor may be controlled such that a fault condition is detected in the first phase of the three phase input and the contacts of the corresponding assembly are controlled to open when the current in the first phase is at a zero crossing. Since the second and third phases of a three phase input lag the first phase by 120 and 240 degrees, respectively, breaking open of the contacts for the contact assemblies for the second and third phases at the opening of the contacts of the contact assembly of the first phase causes the second and third contact assemblies to open when the current through the contacts is not zero. This non-zero opening can cause arcing between the contact elements of the second and third contact assemblies causing contact erosion that can lead to premature failure of the contactor. This holds true for both abnormal switching as stated above as well as normal duty.

This unison-controlled construction also has disadvantages associated with the closing of contacts to cause high transient current conduction between a power source and a load. The closing in unison of all the contacts can cause mechanical torque oscillations that are often negative. As a result, the windings of a motor as well as the mechanical components of the system are subjected to damaging stresses. Additionally, the motor circuit protection disconnect (breaker or fusing) may have to be oversized to avoid unwanted, or "nuisance", tripping by this high transient current. This is particularly problematic for motor starting applications.

A common technique for starting a three-phase induction motor involves the simultaneous application of full voltage to all three windings of the motor. This technique is generally referred to as Direct on Line (DOL) switching. Generally, a three-phase electromagnetic contactor assembly is used to control the application of voltage to the motor windings. At start-up of the motor, the three sets of contacts of the contactor assembly are closed simultaneously to apply full voltage to all three windings of the motor. For motors with six terminals (two terminals accessible for each stator winding) the contacts are connected so that upon closure, all three windings are energized simultaneously. Heretofore, this simultaneous closure has been achieved with an electromagnetic contactor consistent with that described above where the three sets of contacts share a common actuating assembly.

The drawbacks of such an in-unison contactor assembly design can be particularly damaging for motor starting applications. That is, the build up of torque in the motor generally associated with DOL starting is accompanied by a strong initial transient torque pulsation, as a result of the sudden application of voltage and current. The torque may oscillate between both positive and negative values, and the swing may be many times the normal full load torque of the motor. The effect of this pulsation is to place high mechanical stress on the motor and the whole drive train—the shaft coupling, the shaft itself, any gears driven by the shaft, and the load being driven. The stator windings also experience an equal and opposite reaction to the forces generated.

Moreover, if all the poles of a motor starter contactor assembly are closed simultaneously, power is applied simultaneously to all three windings of the induction motor that can inject a DC transient current in addition to the AC current to the motor. This superposition of the DC and AC currents can then cause high inrush currents, current imbalances, and strong torque pulsations until the DC current gradually decays with the magnetization time constant of the motor.

The DC transient resulting from the simultaneous application of power to the three windings of an induction motor will now be set forth mathematically. The three-phase supply voltage may be described by a space vector $\bar{u}_s(t)$ given by:

$$\bar{u}_S(t) = u_S e^{j(\omega t + \alpha)} \quad \text{(Eqn. 1)},$$

where $u_s$ is the supply phase voltage amplitude, and the space vector $\bar{u}_s(t)$ rotates at the angular frequency $\omega$ of the supply; and $\alpha$ is the supply phase angle at the time $t=0$ when power is applied.

The build up of flux $\bar{\psi}$ in the motor according to Faraday's Law is given by:

$$\frac{d\bar{\psi}}{dt} = \bar{u}_s(t) = u_s e^{j\omega t} e^{j\alpha}. \quad \text{(Eqn. 2)}$$

Integration therefore yields:

$$\bar{\psi}(t) = u_s \frac{e^{j\omega t}}{j\omega} e^{j\alpha} + \bar{\psi}_{DC}, \quad \text{(Eqn. 3)}$$

$$= \bar{\psi}(t)_{Steady\ state} + \bar{\psi}_{DC\ transient}, \quad \text{(Eqn. 4)}$$

where $\bar{\psi}_{DC\ transient}$ is the constant of integration required to satisfy initial conditions. When $\bar{u}_s(t)$ is applied to the motor at $t=0$ and at phase angle $\alpha$ with no flux in the motor (i.e. $\psi=0$), then:

$$\bar{\psi}(0) = 0 = u_s \frac{e^{j\alpha}}{j\omega} + \bar{\psi}_{DC}. \quad \text{(Eqn. 5)}$$

Hence, the DC transient flux can be given by:

$$\bar{\psi}_{DC} = -u_s \frac{e^{j\alpha}}{j\omega} = j \frac{\bar{u}_s(0)}{j\omega}, \quad \text{(Eqn. 6)}$$

and therefore the general solution for the flux in the motor can be characterized by:

$$\bar{\psi}(t) = -j \frac{\bar{u}_s(t)}{\omega} + j \frac{\bar{u}_s(0)}{\omega}, \quad \text{(Eqn. 7)}$$

$$= \bar{\psi}(t)_{Steady\ state} + \bar{\psi}_{DC\ transient}. \quad \text{(Eqn. 8)}$$

which yields:

The factor $-j$ multiplying the voltage space vector $\bar{u}_s(t)$ in Eqn. 7 suggests that the steady state flux rotates with $\bar{u}_s(t)$ but lags behind in rotation by ninety degrees. The DC transient flux $\bar{\psi}_{DC}$ is, on the other hand, fixed in orientation ninety degrees ahead of the direction of the initial supply vector $\bar{u}_s(t)$ at the moment of contactor switch-on or initial voltage application, and only gradually decays. In addition, the steady state flux $\bar{\psi}_{SS}(t)$ has a constant amplitude and rotates in a manner determined by the transient $\bar{\psi}_{DC}$ which decays slowly. Hence, as $\bar{\psi}_{SS}(t)$ rotates, the presence of the DC flux $\bar{\psi}_{DC}$ causes the amplitude of the resultant flux $\bar{\psi}(t)$ to oscillate strongly. The effect is strong torque pulsations and unbalanced currents until the DC transient decays away. These starting pulsations can cause stress during motor operation and directly lead to wear, increased maintenance costs, and, ultimately, premature motor breakdown.

Torque oscillations or pulsations can be particularly problematic for a motor having its windings arranged in a delta configuration. As shown in FIG. 37, severe torque pulsation occurs with full DOL starting of a "delta" motor with simultaneous closure of the contacts for the three-phases of the motor. While this torque does decay over time, relatively strong mechanical stresses are placed on the motor from the moment of contactor closure until the decaying is complete.

The problems associated with torque oscillations are also relevant to "wye-delta" switching of delta-connected motors. Larger delta-connected motors are commonly started using a wye-delta switching method wherein the motor windings are first connected in a star or wye configuration, and the three pole contactors are closed simultaneously to supply power to all three windings. At some moment thereafter, and generally when the motor is up to normal operating speed, the contactors open and then reclose in such a manner to reconfigure the motor windings in a delta configuration. Heretofore, a timer has been used to initiate the switching from the wye to the delta configuration. Moreover, similar to the initial closure of the contactors to connect the windings in a star configuration, the contactors also re-close simultaneously when connecting the windings in the delta configuration without regard to any back force, or rotor electromotive force (emf), present in the motor as the motor slows from being disconnected from a power supply. The aim is to re-apply the supply voltages simultaneously to the three delta-connected windings with minimal delay.

The benefit of starting a motor with its windings in a wye configuration is that the motor draws only one third of the line current that it would draw if started directly with the windings in a delta configuration. This reduces adverse impact on the supply of the normally high starting current of the motor (typically 6-8 times full load current). The motor is only switched into delta configuration when sufficient time has elapsed for the motor to be running at high speed, when it draws less current. Generally, with wye-delta switching, the initial stator voltage is reduced by half and the torque and line currents are reduced by a factor of three. Nevertheless, as shown in FIG. 38, standard wye-delta switching remains susceptible, albeit to a lesser degree, to torque pulsations at both the initial wye switch-on, and at the wye-delta switch-over.

One proposed solution to reduce torque oscillations that result at the switch-over from a wye configuration to a delta configuration is to allow the back electromotive force present in the motor to decay. That is, when the motor is running with its windings in a wye configuration and the contactors are simultaneously opened, the rotor of the motor will continue to rotate. Depending upon the characteristics of the motor, the rotor will quickly or slowly expend its kinetic energy. Simply, despite no current in the stator windings, there will still be current in the rotor bars during this slow-down in rotation. The current in the rotor bars will thus induce an alternating emf that can be observed at the motor terminals. The currents decay with the rotor time constant Lr/Rr, and cause the rotor to behave as a decaying magnet that rotates at the shaft speed. Due to the slowing of the rotor under load, the back emf can be in or out of phase with the voltage supply when the contactors are re-closed in the delta configuration. If the back emf is out of phase at the moment of re-connection of the power supply to the motor windings, relatively large transient current and torque pulsations may occur. It is therefore advantageous to allow the back emf to decay before simultaneously re-closing the contactors to connect the motor windings in delta. However, as shown in FIG. 39, simply allowing the back force, or rotor emf, to decay does not eliminate torque pulsations or oscillations when the contactors are re-closed simultaneously. In FIG. 39, the emf was allowed to decay ninety percent (90%) before simultaneous re-closure of the contact to connect the motor windings in a delta configuration.

It would therefore be desirable to design a system to control power application to a motor or other power system during transitioning from one mode of operation to another mode of operation, such as from motor start-up to motor running. In this regard, negative torque oscillations and potentially damaging stresses on the motor and its components are reduced.

BRIEF DESCRIPTION OF THE INVENTION

The present invention provides a method and apparatus of independently controlling contactors in an asynchronous or multi-stage manner to reduce mechanical stress on an induction motor or other electric power system that overcomes the aforementioned drawbacks and provides a control scheme that is applicable therewith.

By preventing the simultaneous or synchronous breaking and making of the contactors employed to connect the windings of the motor to a power supply, damaging mechanical stresses placed on the induction motor can be reduced. Asynchronously connecting the windings to the power supply via the asynchronous or non-simultaneous closing of the contactors of a modular contactor assembly reduces the potentially damaging transient currents, the associated torque oscillations, and mechanical stresses. The present invention is particularly applicable to motors that are started with its windings in a wye configuration followed by the reconnection of the windings in a delta configuration when the motor is close to or at normal running speed.

Therefore, in accordance with one aspect of the present invention, a method of controlling operation of an electric device includes the steps of monitoring a voltage output of an electric load recently disconnected from a power supply and determining when a characteristic of the voltage output reaches a given value. The method further includes that upon the characteristic of the voltage output reaching the given value, asynchronously switching a number of contactors to reconnect the electric load to the power supply.

In accordance with another aspect, the present invention includes a controller to control operation of an electric power system. The controller is programmed to transmit a first contactor close signal to a first set of contactors to connect windings of a polyphase electric power system in a wye circuit configuration. The controller is also programmed to monitor a first output of the polyphase power system, and when the first output attains a first given value, transmit a contactor open signal to the first set of contactors to form an open circuit condition to disconnect the windings of the polyphase electric power system from the power supply. The controller is further programmed to monitor a second output of the polyphase power system during the open circuit condition, and when the second output attains a second given value, transmit a second contactor close signal to a second set of contactors to non-simultaneously close the second set of contactors to connect the windings to a delta circuit configuration.

According to another aspect of the invention, a system to control operation of a polyphase electric motor is provided. The system includes a first set of contactors and a second set of contactors. Both sets of contactors are electrically connected between a voltage supply and windings of a polyphase electric motor. The system also has a controller configured to asynchronously close and open the first set of contactors to electrically connect and disconnect the windings in a wye configuration during a first mode of motor operation and asynchronously close the second set of contactors to electrically connect the windings in a delta configuration during a second mode of motor operation different from the first mode of motor operation.

Various other features, objects, and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to an electromagnetic contactor assembly for use in starter applications such as, the switching on/off of a load as well as to protect a load, such as a motor, from current overload, oscillation, and, ultimately, potentially damaging mechanical stresses. The electromagnetic contactor assembly and controls of the present invention are equivalently applicable to heating load contactor assemblies, on-demand modular contactor assemblies, modular large frame contactor assemblies, and the like. The present invention is also applicable with other types of contactor assemblies where it is desirable to reduce contact erosion resulting from arcs during breaking and bounce arcs during making of the contacts. Additionally, the present invention will be described with respect to implementation with a three-phase induction motor; however, the present invention is equivalently applicable with other electrical devices. Furthermore, the present invention will be described with respect to controlling connection of a power supply to an electrical load, such as an induction motor.

Figure 1:
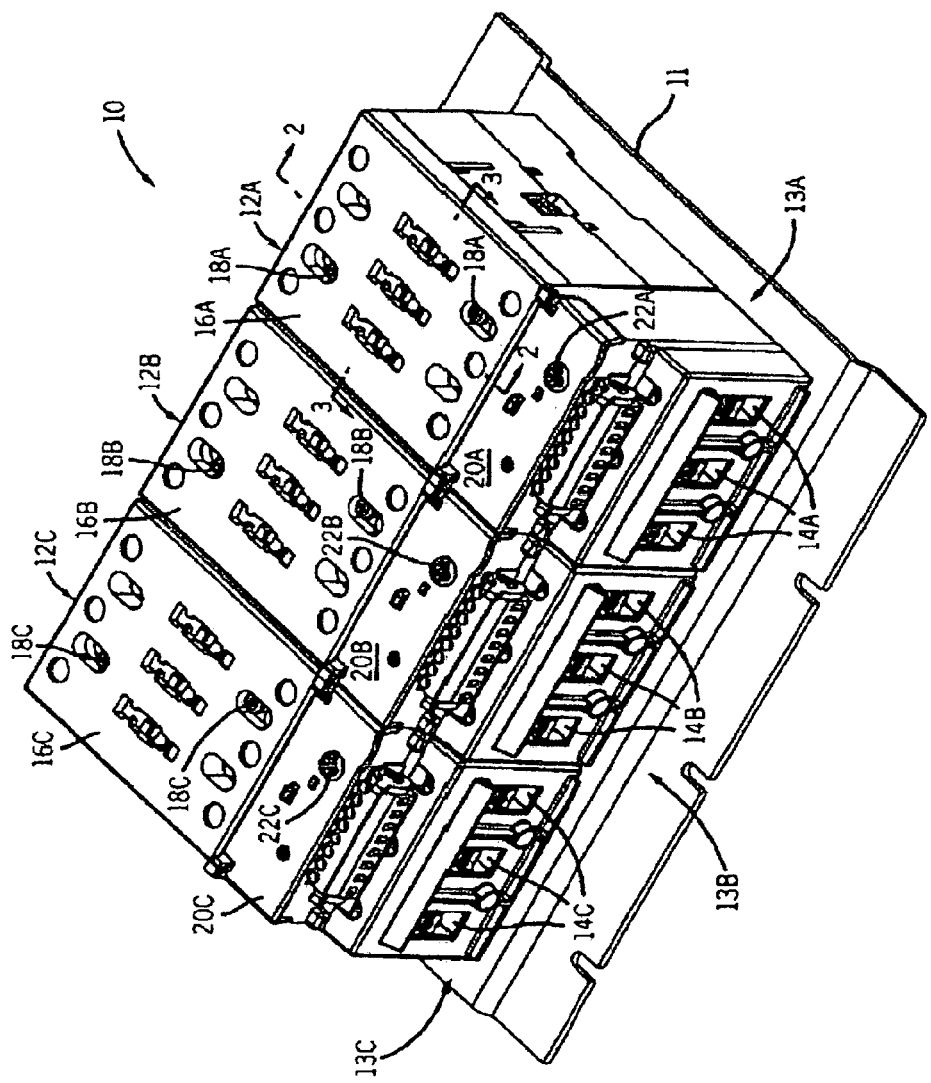
FIG. 1 is a perspective view of a modular contactor assembly in accordance with the present invention.

Referring now to FIG. 1, a modular contactor assembly 10 is shown in perspective view. The modular contactor assembly 10 includes electromagnetic contactors 12A-C for a three phase electrical system. Each contactor 12A-C is designed to switch current to a motor or other electrical device. In the shown configuration, contactors 12A-C are mounted to plate 11 configured to support each of the contactors as well as an optional cover (not shown). In the illustrated embodiment, each of the contactors 12A-C of contactor assembly 10 is connected to an overload relay 13A-C for use in a starter that operates in industrial control applications, such as motor control. Assembly 10 could equivalently be implemented without relays 13A-C for other applications. Apertures 14A-C located in each relay 13A-C, respectively, facilitate electrical connection of lead wires to the contactor assembly. Since each contactor/overload relay includes three apertures; a common bus plate (not shown) jumping all three apertures could be inserted for the end user to attach single point wiring. The bus plate may include lugs or ring terminals for the end user to connect wires to the assembly. As will be described in greater detail below, this three-way connection for each phase is beneficial under fault conditions as the current for each phase A-C can be distributed evenly within each contactor to assist with minimizing contact arcing and contact erosion, especially on make. Each contactor 12A-C includes a top cover 16A-C that is secured to the contactor frame via screws 18A-C. Each relay 13A-C also includes a cover 20A-C that is snapped to the relay frame and is hinged to allow access to an FLA adjustment potentiometer (not shown). Each relay 13A-C includes a reset button 22A-C.

Figure 2:
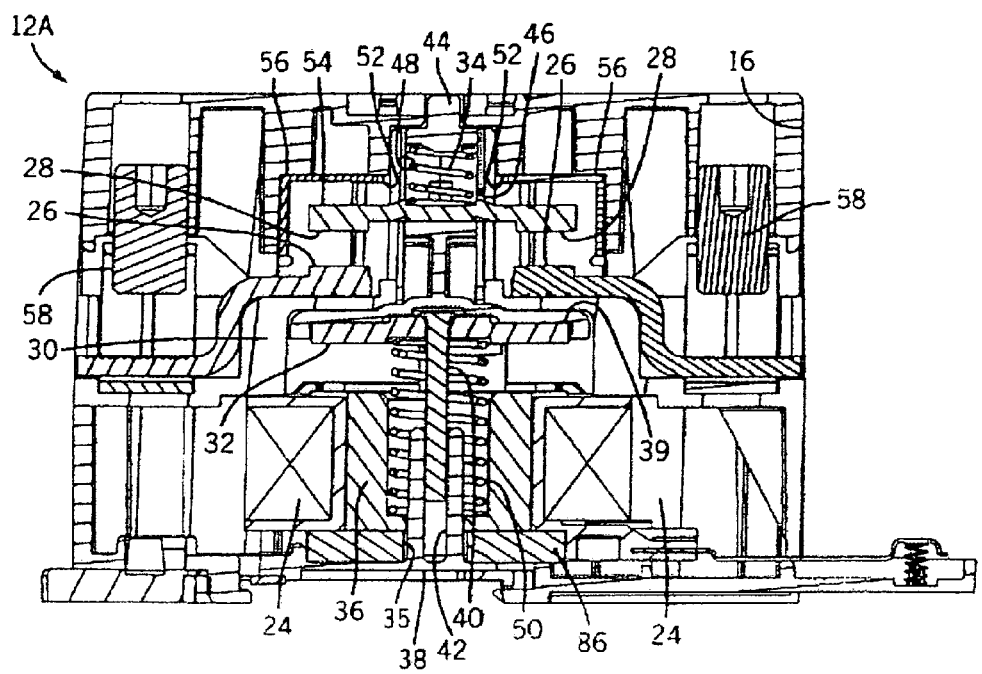
FIG. 2 is a cross-sectional view of one contactor of the modular contactor assembly taken along line 2-2 of FIG. 1.

Referring to FIG. 2, a longitudinal cross-sectional view of one of the contactors 12A-C of the modular contactor assembly 10 taken along line 2-2 of FIG. 1 is shown (without overload relay 13A-C from FIG. 1). Specifically, contactor 12A is cross-sectionally shown but a cross-sectional view of contactors 12B or 12C would be similar. Contactor 12A is shown in a normally open operating position prior to energization of an electromagnetic coil 24 with contacts 26, 28 separated and open. Coil 24 is secured by the contactor housing 30 and is designed to receive an energy source or an in-rush pulse at or above an activation power threshold that draws armature 32 into the magnet assembly 35. A movable contact carrier, secured to the armature 32, is also drawn towards magnet assembly 35. Contacts 28, which are biased by spring 34 towards stationary contacts 26, are now positioned to close upon stationary contacts 26 and provide a current path. After energization of coil 24, a second energy source at or above a reduced holding power threshold of the coil 24 is provided to the coil and maintains the position of the armature 32 to the magnet assembly 35 until removed or a high fault current occurs thereby overcoming the reduced power threshold to disengage the armature from the magnet assembly causing the separation of the contacts, as will be described in greater detail hereinafter.

Magnet assembly 35 consists of a magnet post 36 firmly secured to magnet frame 86. Magnet post 36, magnet frame 86, and armature 32 are typically solid iron members. Coil 24 includes a molded plastic bobbin wound with copper magnet wire and is positioned centrally over magnet post 36 and inside magnet frame 86. Preferably, coil 24 is driven by direct current and is controlled by pulse width modulation to limit current and reduce heat generation in the coil. When energized, magnet assembly 35 attracts armature 32 that is connected to a movable contact carrier 39. Moveable contact carrier 39 along with armature 32 is guided towards magnet assembly 35 with guide pin 40 and molded housing 30 walls 46, 48.

Guide pin 40 is press-fit or attached securely into armature 32 which is attached to movable contact carrier 39. Guide pin 40 is slidable along guide surface 42 within magnet assembly 35. The single guide pin 40 is centrally disposed and is utilized in providing a smooth and even path for the armature 32 and movable contact carrier 39 as it travels to and from the magnet assembly 35. Movable contact carrier 39 is guided at its upper end 44 by the inner walls 46, 48 on the contactor housing 30. Guide pin 40 is partially enclosed by an armature biasing mechanism or a resilient armature return spring 50, which is compressed as the movable contact carrier 39 moves toward the magnet assembly 35. Armature return spring 50 is positioned between the magnet post 36 and the armature 32 to bias the movable contact carrier 39 and armature 32 away from magnet assembly 35. A pair of contact bridge stops 52 limits the movement of the contact bridge 54 towards the arc shields 56 during a high fault current event. The combination of the guide pin 40 and the armature return spring 50 promotes even downward motion of the movable contact carrier 39 and assists in preventing tilting or window-locking that may occur during contact closure. When the moveable contact carrier 39, along with armature 32, is attracted towards the energized magnet assembly 35, the armature 32 exerts a compressive force against resilient armature return spring 50. Together with guide pin 40, the moveable contact carrier 39 and the armature 32, travel along guide surface 42 in order to provide a substantially even travel path for the moveable contact carrier 39. Three pairs of crimping lugs 58 are provided per contactor and used to secure lead wires to the contactor. Alternatively, a common busbar containing stationary contacts (not shown) may be used as a base for end user wire connection either through ring terminals or appropriately sized lug.

Figure 3:
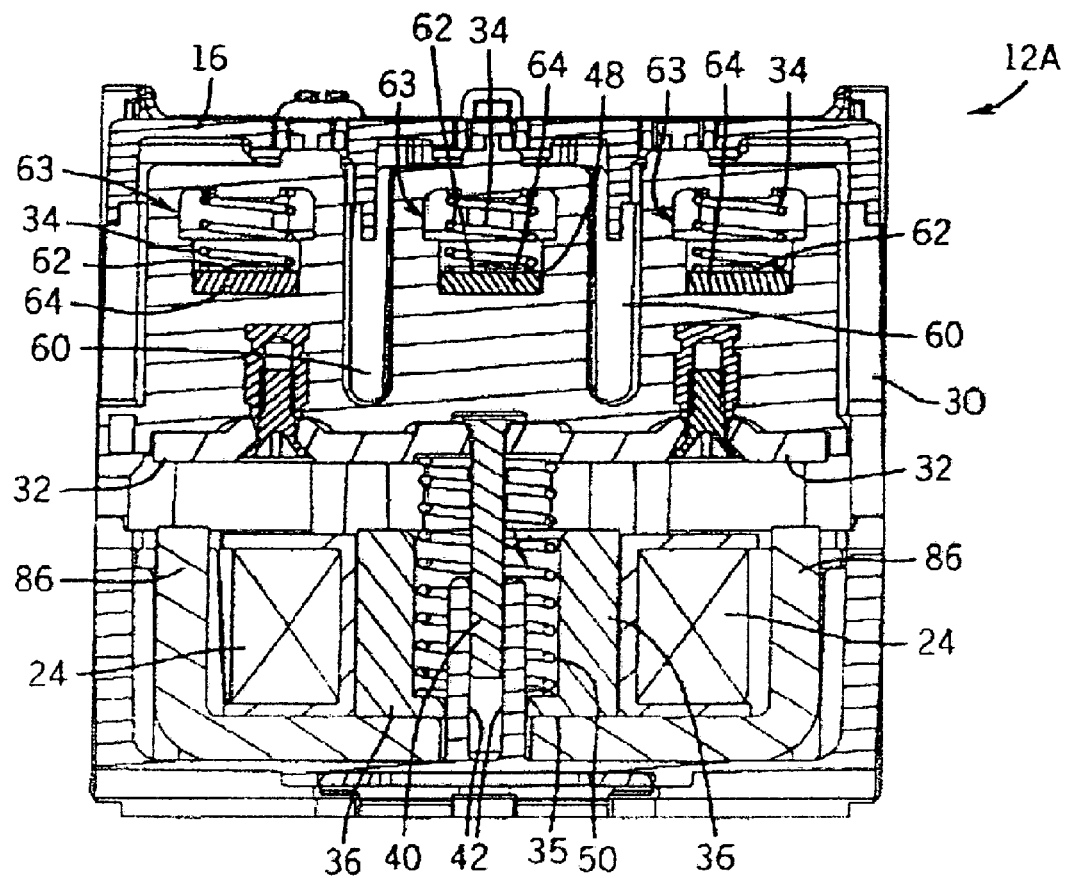
FIG. 3 is a cross-sectional view of one contactor of the modular contactor assembly taken along line 3-3 of FIG. 1.

Referring to FIG. 3, a lateral cross-sectional view of the contactor 12A is depicted in the normal open operating position prior to energization of the electromagnetic coil 24. Initially, the armature 32 is biased by the resilient armature return spring 50 away from the magnet assembly 35 toward the housing stops 60 resulting in a separation between the armature and core. The contact carrier assembly also travels away from the magnet assembly 35 due to the armature biasing mechanism 50 which creates a separation between the movable contacts 28 and the stationary contacts 26 preventing the flow of electric current through the contacts 26, 28. Biasing springs 34 are connected to a top surface 62 of movable contact 64 and are extended such that a maximum space 63 results between the top of the spring and the movable contact 64.

Figure 4:
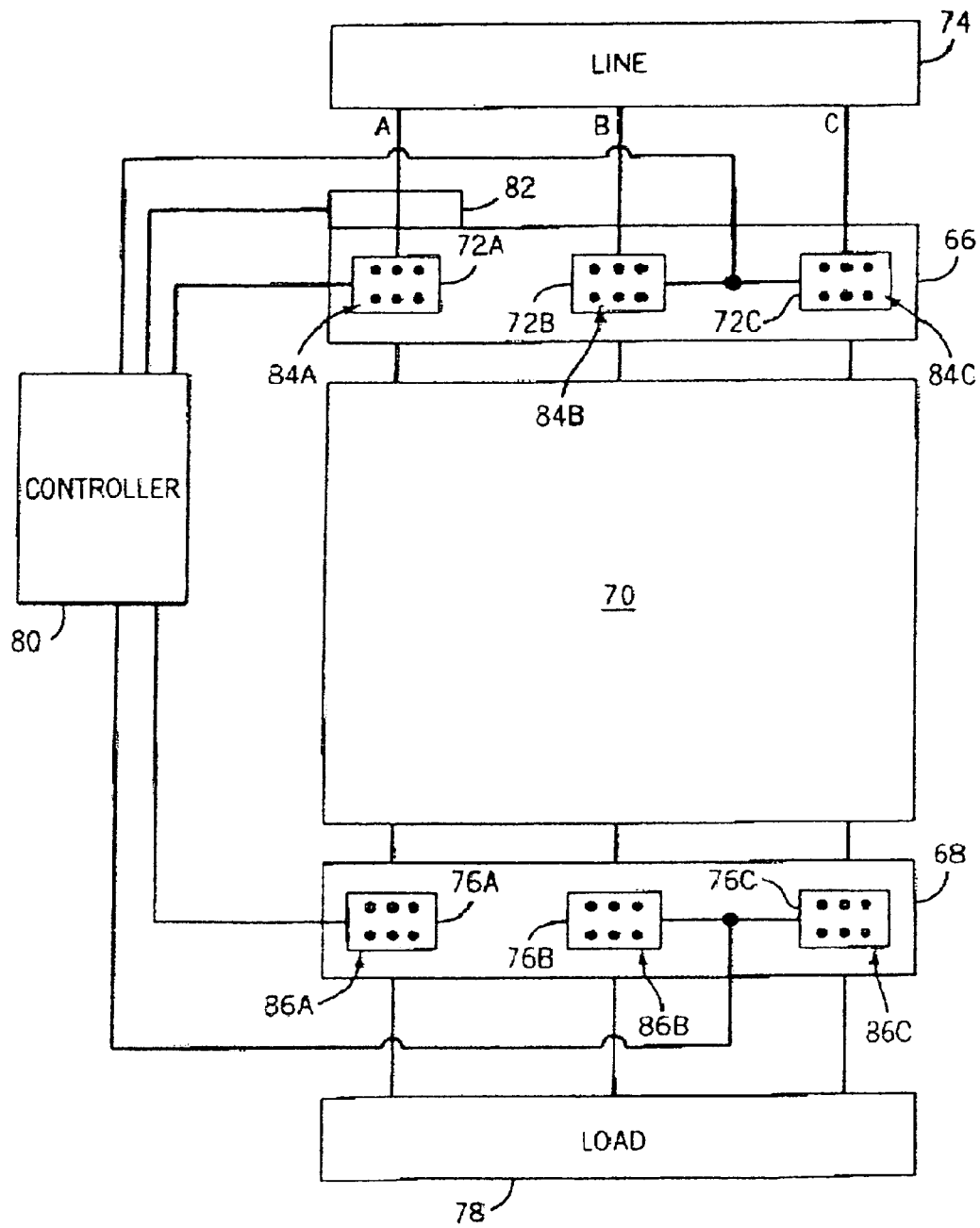
FIG. 4 is a schematic representation of a pair of modular contactor assemblies in accordance with the present invention connected to a soft starter.

Referring now to FIG. 4, a pair of modular contactor assemblies 66 and 68 is shown as isolation devices connected to a softstarter 70. Contactor assembly 66 includes, in a three-phase application, three contactors 72A, 72B, 72C that carry power from a line power source 74 via lines A, B, and C, respectively. Similarly, contactor assembly 68 also includes three contactors 76A, 76B, 76C for a three-phase load 78. As illustrated, there are three contactors within a single contactor assembly before and after the soft starter. Contactor assemblies 66 and 68 are designed to provide galvanic isolation to the soft starter by independently "breaking open" their contactors after the soft starter interrupts the circuit, or in the case of a shorted SCR in the softstarter, interrupts the load themselves (fault condition). Each contactor of contactor assembly 66, 68 includes multiple contacts. Preferably, each contactor includes three contact assemblies and each contact assembly includes one line side contact, one load side contact, and one connecting or bridge contact for connecting the line and load side contacts to one another. For example, the bridge contacts may be moveable contacts such as those previously described.

Controller 80 is connected to an actuating assembly (not shown) in each contactor that is arranged to move the contact assemblies of each contactor in unison between an open and closed position. Each actuating assembly comprises a coil, armature, and magnetic components to effectuate "breaking" and "making" of the contacts, as was described above. Controller 80 is designed to transmit control signals to the actuating assemblies to independently regulate the operation of the contactors. The controller triggers the actuating assemblies based on current data received from a current sensing unit 82, that in the embodiment shown in FIG. 4, is constructed to acquire current data from first phase or pole A of the three-phase line input. While current sensing unit 82 is shown to acquire current data from first phase or pole A, current sensing unit 82 could be associated with the second or third phases or poles B and C of the three-phase line input.

Since each contactor 72A-C and 76A-C has its own actuating assembly, each contactor may be independently opened and closed. This independence allows for one contactor to be opened without opening the remaining contactors of the modular contactor assembly. For example, a first contactor 72A, 76A can be opened and the remaining contactors 72B-C, 76B-C can be controlled to not open until the contacts of the first contactor 72A, 76A have cleared. This delay and subsequent contactor opening reduces arc erosion of the contacts of the subsequently opened contactors since each contactor can be controlled to open when the phase for that contactor is at or near a zero current point. Thus, arcing time is at a minimum. As described above, each contactor 72A-C, 76A-C includes three contact assemblies 84A-C, 86A-C. Each contact assembly is made up of movable contacts and stationary contacts. The contact assemblies within each contactor are constructed to open in unison and are therefore controlled by a common crossbar or bridge. As such, the contact assemblies within a single contactor operate in unison, but the contactors are asynchronously or independently operated with respect to another. As will be described below, controller 80 is connected to contactors 72A and 76A directly but is connected to contactors 76B-C and 76B-C in parallel. As such, contactors 72B-C and 76B-C can be controlled simultaneously.

Figure 5:
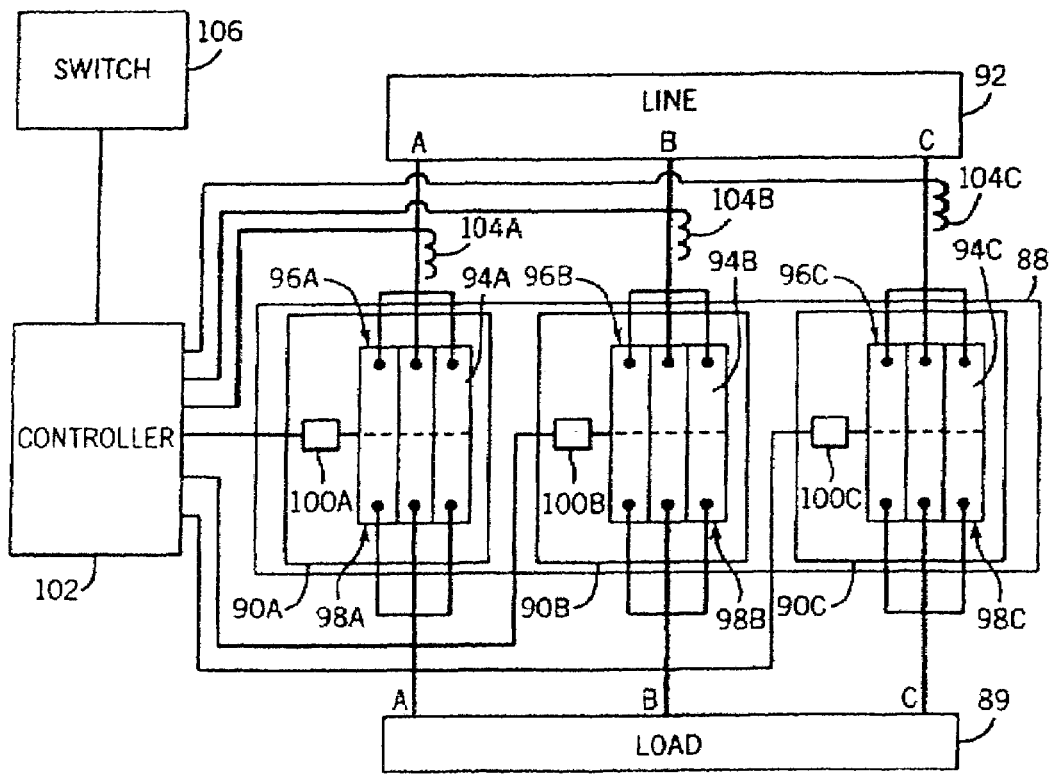
FIG. 5 is a schematic representation of a modular contactor assembly in accordance with another aspect of the present invention.

Referring now to FIG. 5, contactor assembly 88 may be implemented as a switching device to control and protect a load 89 connected thereto. Contactor assembly 88 includes three contactors 90A-C. The number of contactors coincides with the number of phases of the line input 92 as well as load 89. Therefore, in the example of FIG. 5, a contactor is provided for each phase of the three-phase line 92 and load 89. Each contactor 90A-C includes three contact assemblies 94A-C. Each assembly 94A-C includes multiple line side contacts 96A-C and multiple load side contacts 98A-C. Each contactor includes an actuating assembly 100A-C that is connected to and controlled by a controller 102. Controller 102 controls breaking and making of the contacts of each contactor by triggering the actuating assembly in the contactor based on fault data received from transducers 104A-C. Alternately, breaking and making of the contacts could be controlled by an override control or switch 106.

The timing of the breaking of each contactor is determined based on current data received from transducers 104A-C. In a three-phase input environment, three transducers 104A, 104B, and 104C are used. By implementing a transducer for each phase, each contactor may be identified as the "first" pole contactor, as will be described in greater detail below. Conversely, only one transducer may be implemented to collect current data from one phase and the contactor corresponding to that phase would be considered the "first" pole contactor. However, any contactor can be the "first" pole contactor.

Figure 6:
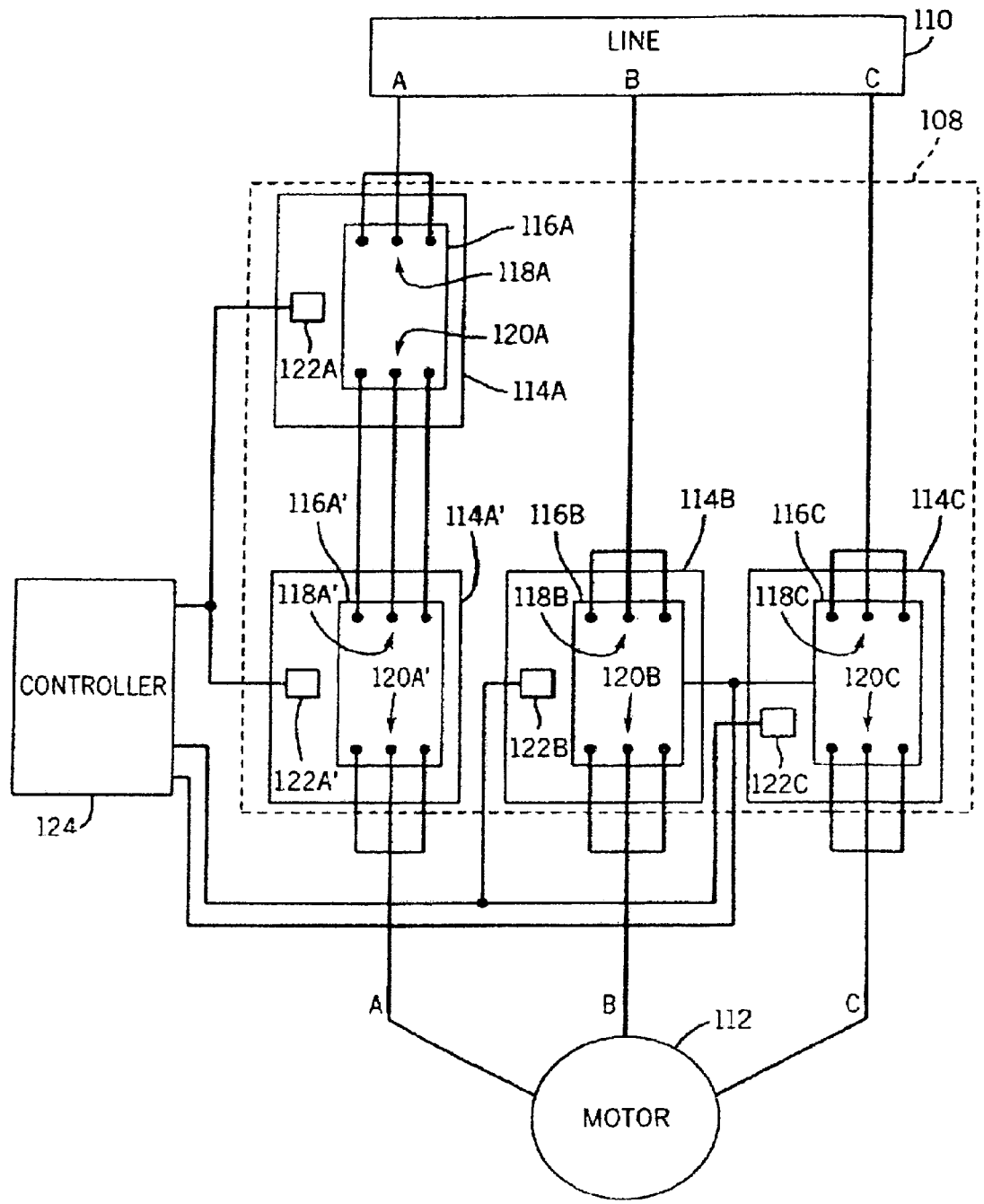
FIG. 6 is a schematic representation of a modular contactor assembly in accordance with the present invention as a motor controller.

Referring now to FIG. 6, a contactor assembly 108 is shown in a typical motor control application configuration between a power line source 110 and a three-phase motor 112. Contactor assembly 108 is a modular contactor assembly and includes four contactors 114A, A', B, C similar to the contactors heretofore described. Each contactor 114A-C includes a set of contact assemblies 116A-C. Specifically, each contact assembly includes a set of line side contacts 118A-C and load side contacts 120A-C. Each contactor also includes an actuating assembly 122A-C that breaks and makes the contact assemblies of each respective contactor in unison. However, since each contactor has its own actuating assembly, the contactors can be independently controlled.

Connected to each actuating assembly and constructed to independently control the contactors is controller 124. Controller 124 opens and closes each contactor based on the corresponding phase A-C of the contactor crossing a particular current value or voltage value. In one embodiment, each contactor is controlled to open when the current in the corresponding phase is approximately zero. Opening of the contacts of the contactor at or near a zero current reduces the likelihood of arc erosion between the contacts of the contactor. However, controller 124 can be configured to independently open the contactors based on the current in the corresponding phase reaching/crossing a particular non-zero value. Current data is acquired by at least one current sensor (not shown) connected between the line 110 and the contactors 114A-C.

Still referring to FIG. 6, contactors 114A and 114A' are shown as being serially connected to another. This configuration has a number of advantages, particularly for high voltage applications (i.e. greater than 600 V). Connecting two contactors in series and designating the two contactors as the first contactors to open when a fault is detected or open command is issued allows the two serially connected contactors 114A,A' to share high switching energy stress. As a result, more energy is dissipated in the contactors 114A,A' thereby reducing the energy absorption burden of contactors 114B,C. Additionally, since contactors 114A,A' are also connected to the controller in parallel with another, the controller can cause contactors 114A,A' to open simultaneously. This results in a greater arc voltage being generated by the four arcs as opposed to a conventional double break system and reduces the current and contact erosion. The multiple contact gaps also reduce the likelihood of re-ignitions after current zero.

The configuration illustrated in FIG. 6 shows an embodiment of the present invention; however, additional configurations not shown are contemplated and within the scope of this invention. For example, in jogging applications, three sets of two serially connected contactors may be arranged in parallel and independently controlled.

As stated above, the modular contactor assembly includes multiple contactors that are independently opened by an actuating mechanism controlled by a controller based on current data acquired from one or more current sensors.

Since the contactors have a unique actuating assembly, the contactors can be controlled in accordance with a number of control techniques or algorithms. Some of these control schemes will be described with respect to FIGS. 7-9.

Figure 7:
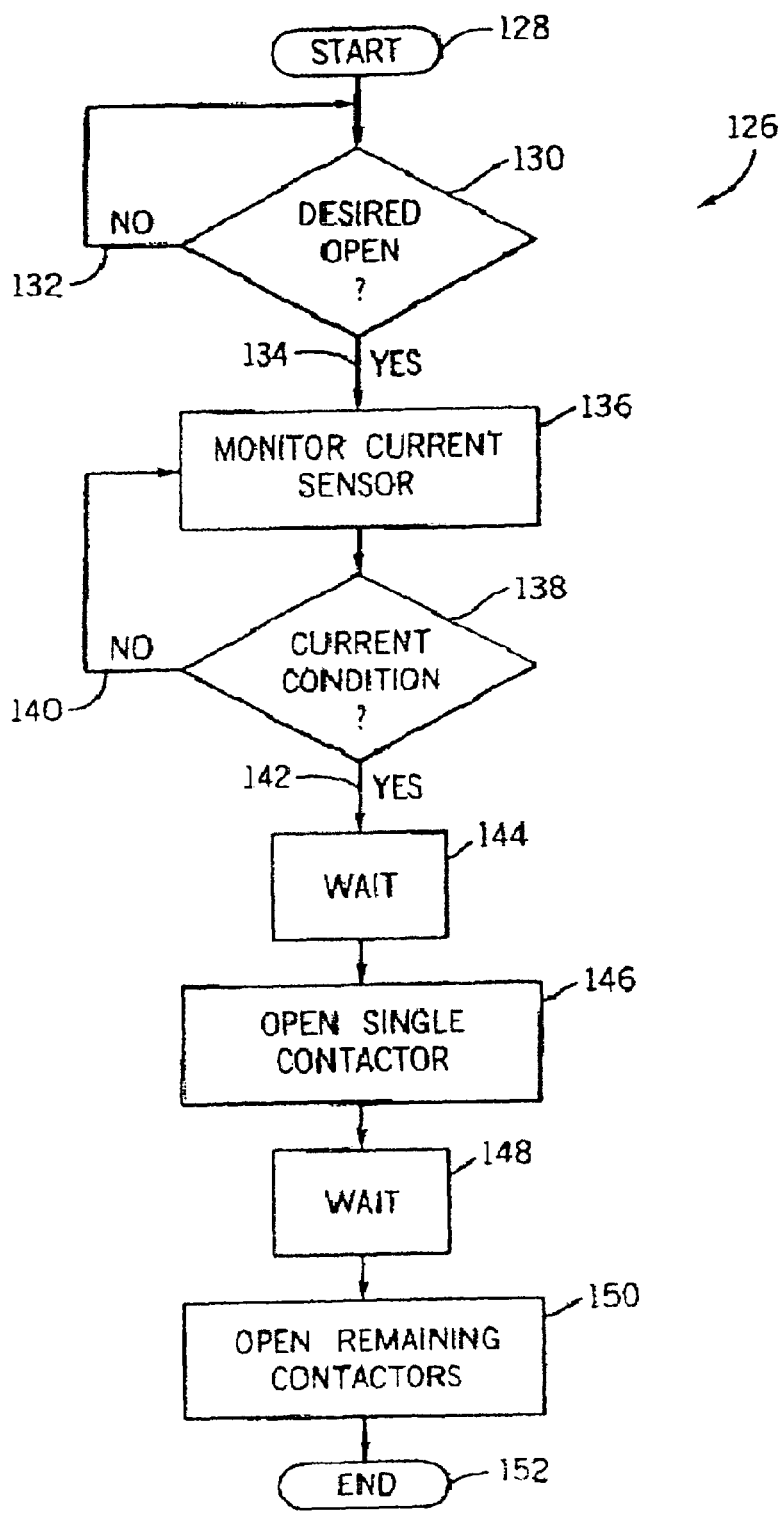
FIG. 7 is a flow chart setting forth the steps of a technique of independently controlling contactors of a modular contactor assembly in accordance with one aspect of the present invention.

Referring now to FIG. 7, the steps of a control technique or algorithm for a modular contactor assembly in accordance with the present invention is shown. The steps carried out in accordance with technique 126 are equivalently applicable with a modular isolation contactor, a modular heating load contactor, a modular on-demand switching contactor, and the like. The steps begin at 128 with identification that an open condition is desired 130. Identification of a desired open condition may be the result of either a dedicated switch open command or a fault indicator signal indicating that a fault condition is present and at least one contactor should be opened. If an open condition is not desired 130, 132, the technique recycles until an open condition is desired 134. When an open condition is desired 130, 134, current in a phase of the input power is monitored at 136 using a current sensor. Current is monitored to determine when a specified current condition 138 occurs. Until the current condition occurs 138, 140, current in the phase is monitored. Once the current condition occurs 138, 142, a wait step 144 is undertaken.

The current condition, in one embodiment, is a current zero in the monitored phase of the three-phase input. Wait step 144 is a time delay and is based on the time required from the actuating assembly receiving the switch open signal to the actual contact separation of the corresponding contactor. After the time delay has expired 144, a switch or break open signal is sent to the actuating assembly for a single contactor at step 146. The multiple contact assemblies for the contactor are then caused to open and, as such, an open circuit is created between the line and load for the corresponding phase of the three-phase input.

After the single contactor is opened at step 146, a wait step 148 is once again undertaken. The waiting period at step 148 is of sufficient length to insure that the single contactor has opened before the remaining contactors of the contactor assembly are opened at 150. Preferably, the contacts of the single contactor are opened one to two milliseconds before current zero. After the remaining contactors are opened at step 150, all of the contactors are opened and an open circuit between the line and load is created 152.

Figure 8:
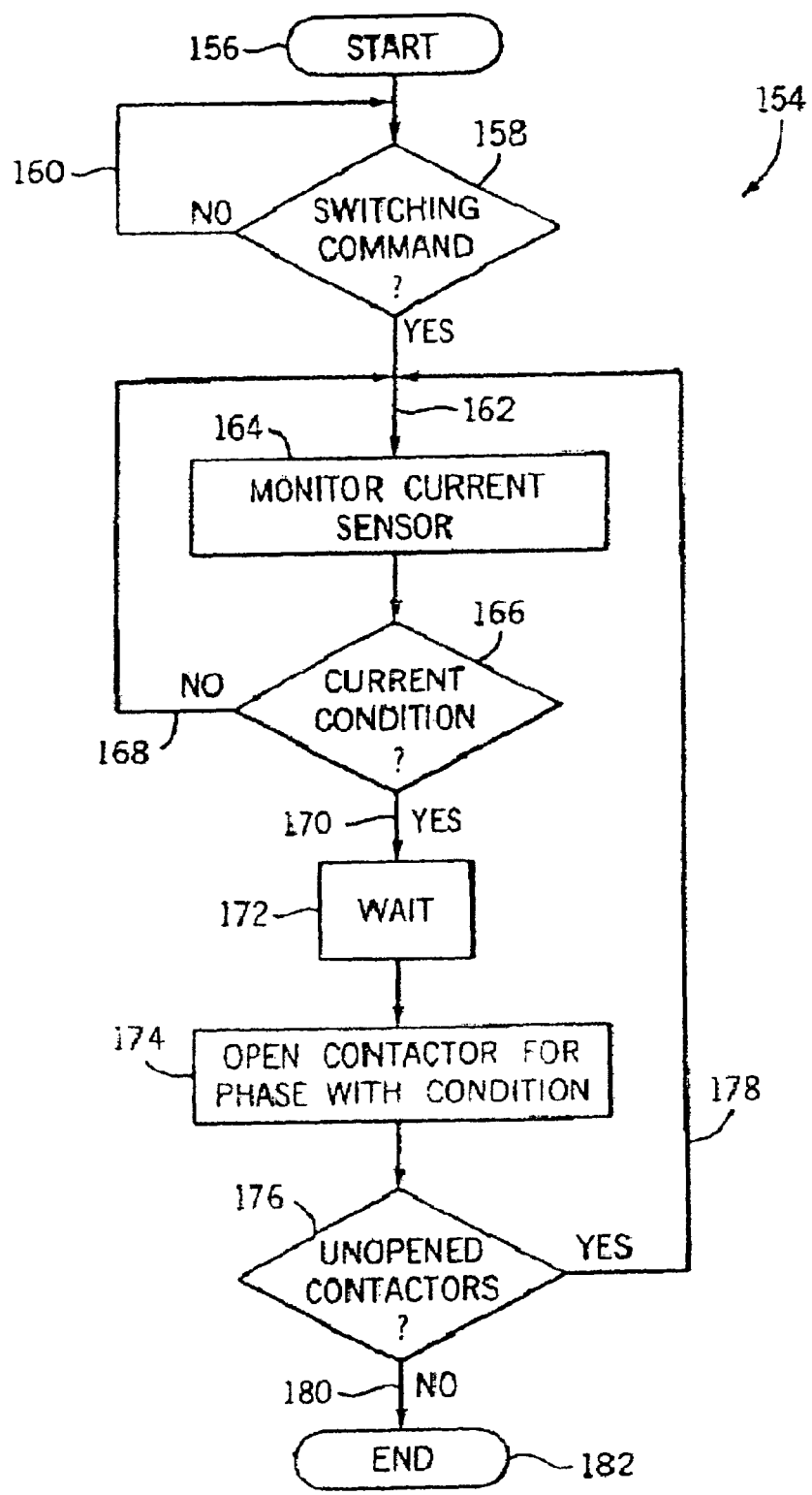
FIG. 8 is a flow chart setting forth the steps of a technique of independently controlling contactors of a modular contactor assembly according to another aspect of the present invention.

Referring now to FIG. 8, another technique 154 for controlling modular contactors in a single contactor assembly begins at step 156, and awaits a desired open switching or fault command at step 158. If an open condition is not desired 158,160, technique 154 recycles until an open condition is desired 158,162. When an open condition is desired, current in each phase of the three-phase input signal is monitored at 164. As such, technique 154 is particularly applicable with a modular contactor assembly dedicated for controlled switching wherein each phase has a dedicated current sensor or transducer, similar to that described with respect to FIG. 5.

Current is monitored in each phase to determine when a current condition in that phase occurs 166. Monitoring continues until current in the phase crosses a specific point or value 166, 168. The current condition is preferably defined as the next current zero in the phase following receipt of the switching or fault indicator signal. However, the current condition could also be any non-zero point on the current wave. Once the current condition is identified in a single phase 166, 170, technique 154 undergoes a wait or hold step at 172. The time period of the wait step 172 is a delay time based on the time required from an actuating assembly receiving an open contactor signal for that contactor to the actual breaking of the contacts in the contactor. Once the delay time has expired, the contactor for the phase in which the current zero condition was identified is opened at step 174. Preferably, the contact assemblies of the contactor are opened in unison one to two milliseconds before the next current zero in the phase corresponding thereto.

Once the contactor is opened 174, a determination is made as to whether there are additional contactors that are unopened 176. If so 176, 178, technique 154 returns to step 162 wherein current is monitored in the phases of the closed contactors. As such, each contactor is independently opened with respect to one another. Because the second and third phase current will have the same phase angle after the first phase is cleared, the contactors in the last two phases will open simultaneously. Once all the contactors are opened 176, 180, the process concludes at step 100 with all of the contactors being in an opened or broken state.

Figure 9:
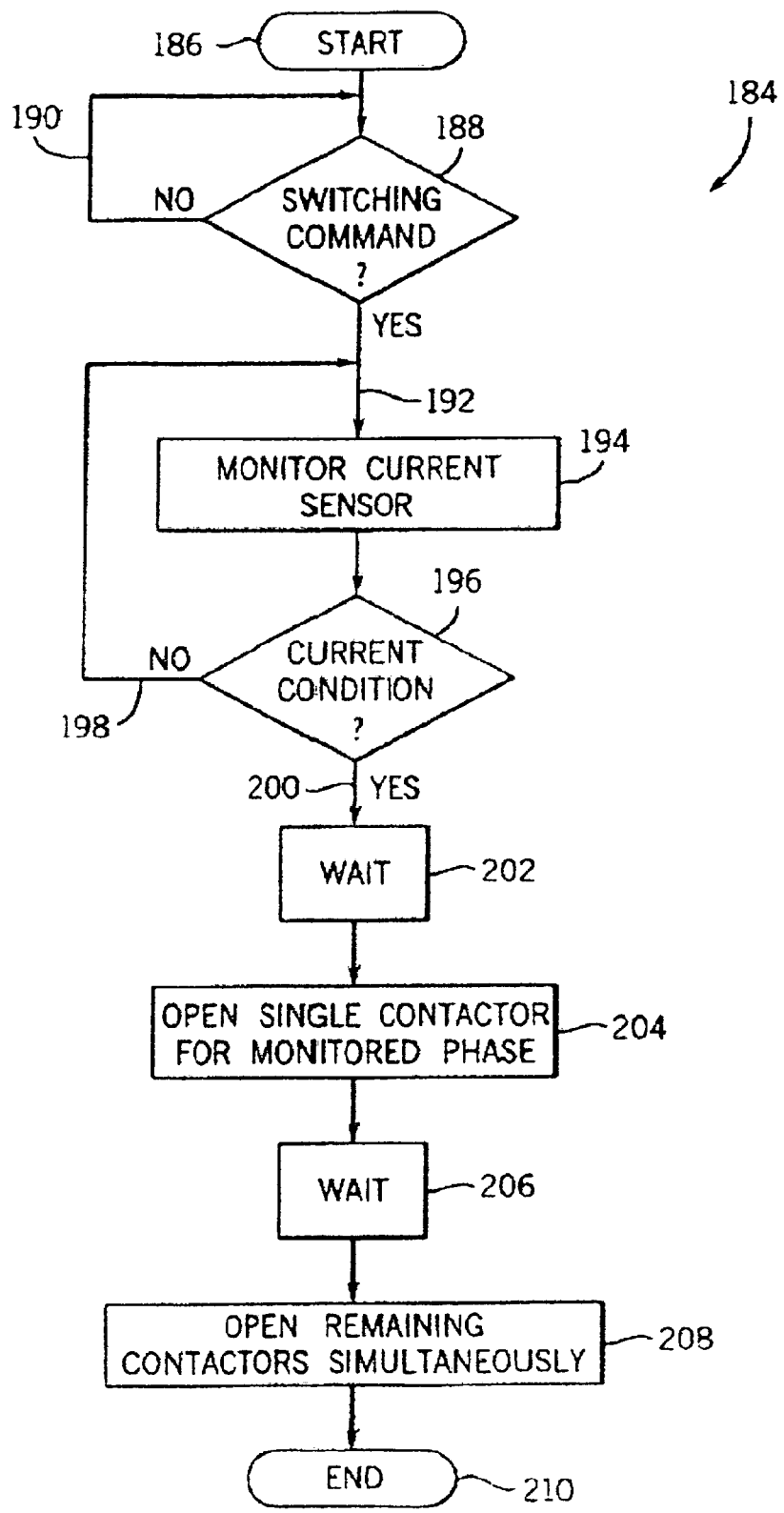
FIG. 9 is a flow chart setting forth the steps of a technique for independently controlling contactors of a modular contactor assembly in accordance with another aspect of the present invention.

Referring now to FIG. 9, a technique or process 184 particularly applicable to independently controlling contactors of a modular isolation contactor assembly begins at 186, and at step 188 a switching or fault command indicative of a desired open condition is identified. If an open condition is not desired 188, 190, the process recycles until such a command is received. Failure to receive such command is indicative of a desire for continued electrical connection between a line and a load. Once a switching or fault indicator signal or command is received 188, 192, current is monitored using a current sensor in one phase of a three-phase input signal. Any phase of a three-phase input may be monitored but, preferably, only one phase is, in fact, monitored. Current in the phase is monitored to determine when a specified current condition occurs 114. Preferably, the current condition is defined as a current zero signal being received from the current sensor based on the monitored phase crossing a current zero point. However, a non-zero point on the current signal could also be considered the specified current condition. If a current condition is not received 196, 198, the process continues monitoring current in the selected phase. Once the current condition occurs and is identified by the controller 196, 200, the process implements a wait step 202 before the controller transmits a break open signal to an actuating assembly for the single contactor corresponding to the monitored phase. The wait or delay period is based on a time interval required from the actuating assembly receiving the signal to the breaking open of the corresponding contactor.

Once the delay time has expired 202, the contactor corresponding to the monitored phase is opened at 204. Preferably, the contactor is broken at a point one to two milliseconds before the next current zero in the corresponding phase. At step 206, the process waits until the multiple contacts have opened before opening the remaining contactor at step 208. Preferably, the remaining contactors are opened simultaneously. For example, in a three-phase environment, a first pole contactor would be opened and subsequent thereto the contactors for the second and third poles, respectively, would be simultaneously opened by their respective actuating assemblies. Once all the contactors are opened, the line and load are isolated from each other and the process ends 210.

The present invention has been described with respect to independently breaking contactors of a modular contactor assembly. However, there are a number of advantages of the present invention with respect to making or closing of independently controlled contactors. Point-on-Wave (POW) switching or control is particularly advantageous with the modular contactor assembly of the present invention. POW switching allows the contacts of a contactor to be closed based on voltage data acquired from a voltage sensor and be opened based on current data acquired from a current sensor. POW switching reduces contact erosion and therefore improves contact switching by breaking open the contacts of the contactor in such a manner as to minimize or prevent an arc being formed between the contacts. For closing of the contacts, POW switching is also beneficial in reducing transient current and negative torque oscillations in the motor (load) by closing the contacts at precise voltage points.

Figure 10:
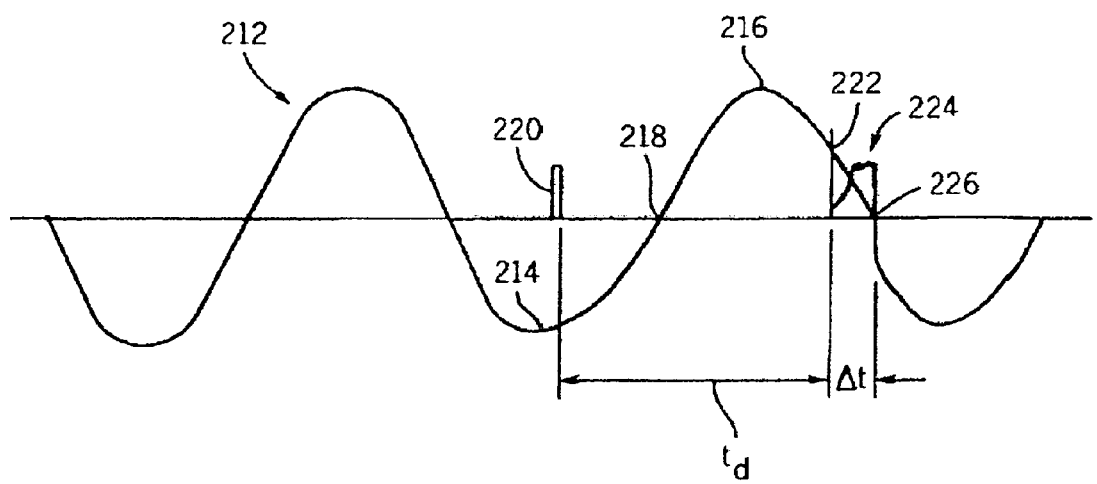
FIG. 10 is a waveform for a single phase of current during opening a contactor in accordance with the present invention.

Referring now to FIG. 10, a typical sinusoidal current waveform 212 for a single phase of a three-phase power signal is shown. The value of the current varies along each point of the waveform from a maximum negative current value 214 to a maximum positive current value 216. Between successive minimum values (or maximum values), the waveform crosses a zero point 218. At point 218, the current for the corresponding phase being applied to the load is at or near a minimum. As discussed above, it is desirable to open a contactor when the current waveform is at or near point 218 to reduce an arc being formed between the contacts of the contactor.

Waveform 212 is generally constant as power is supplied to the load. Variations in magnitude, frequency, and phase will occur over time, but waveform 212 is generally constant. According to one aspect of the present invention, when an open condition is desired, a switching command or fault indicator signal 220 is received. In FIG. 10, the switching signal is shown relative to the current waveform and corresponds to when the waveform is at point 214. However, this is for illustrative purposes only and the switching or open signal can be received at any point in the current continuum. If the contacts were opened the moment the open condition was desired (switching signal received), the magnitude of the current at that point would be at or near a maximum. This would increase the break arcing time and subsequent contact erosion. Therefore, the controller delays the opening of the contactor by an interval $t_d$. At point 222 the contacts of the contactor are opened. An open circuit condition between the line and the load for that phase does not immediately occur. There is a period $\Delta t$ between the separation of the contacts and an open circuit condition. At $\Delta t$, the short duration of break arc occurs and helps to minimize contact erosion and to prevent re-ignition after current zero, as was discussed above. At point 226 on the waveform, the contactor is opened and an open condition between the line and load is achieved.

Figure 11:
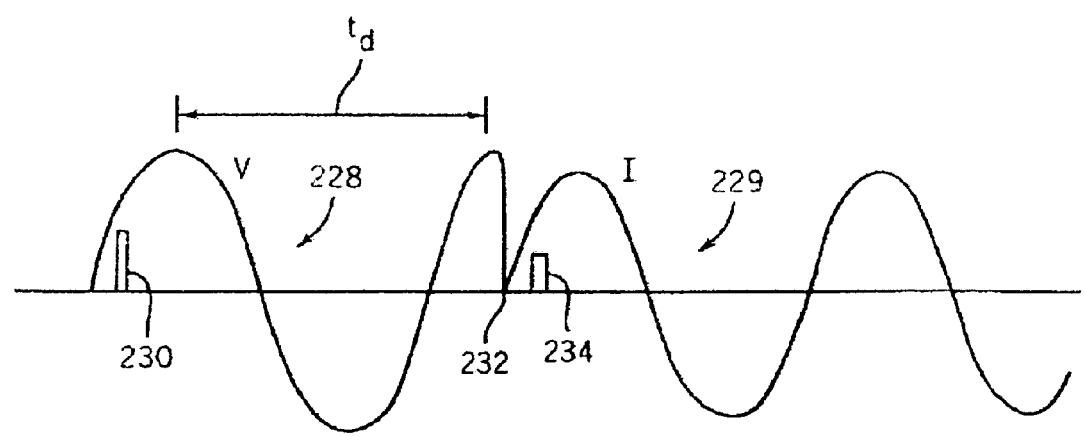
FIG. 11 is a waveform for a single phase of current during closing of a contactor in accordance with the present invention.

Point-on-wave switching is an advantage of the present invention. The purpose of point-on-wave closing is to minimize the asymmetric component in the make currents so to reduce negative torque oscillations in a motor (load) as well as to minimize the bounce arc erosion and contact welding. Referring now to FIG. 11, a set of voltage and current waveforms 228, 229, respectively, for a single phase of a three phase power signal on a delta connected motor with the contactors outside the delta configuration is shown to illustrate "making" or closing of a contactor in accordance with the present invention. The designated first pole to close does not need to "make" at any specific phase angle of the system voltage since there will be no current flow through the contactor. The second and third poles, however, close at a specific point on the voltage waveform to reduce high transient current and the resultant negative torque oscillations. Making of the contacts in each of the second and third contactors is based on at least one voltage data value from a voltage sensor, and in the illustrated example, a close contactor signal is received at point 230 on the waveform. A delay period $t_d$ is observed whereupon only after the designated first pole contactor is closed. After the time delay has lapsed, the contacts of a second contactor are closed at point 232, which is preferably at a 60 degree phase angle of the system voltage at the first pole. The contacts of the third contactor are then closed 90 degrees after the second contactor has closed. Arcing due to contact bounce can also be minimized or eliminated by using multiple sets of contacts in each contactor. Reducing bounce arc 234 is advantageous as it also leads to contact erosion and contact welding. Controlling when the contacts are closed also reduces negative torque oscillations in the motor.

Figure 12:
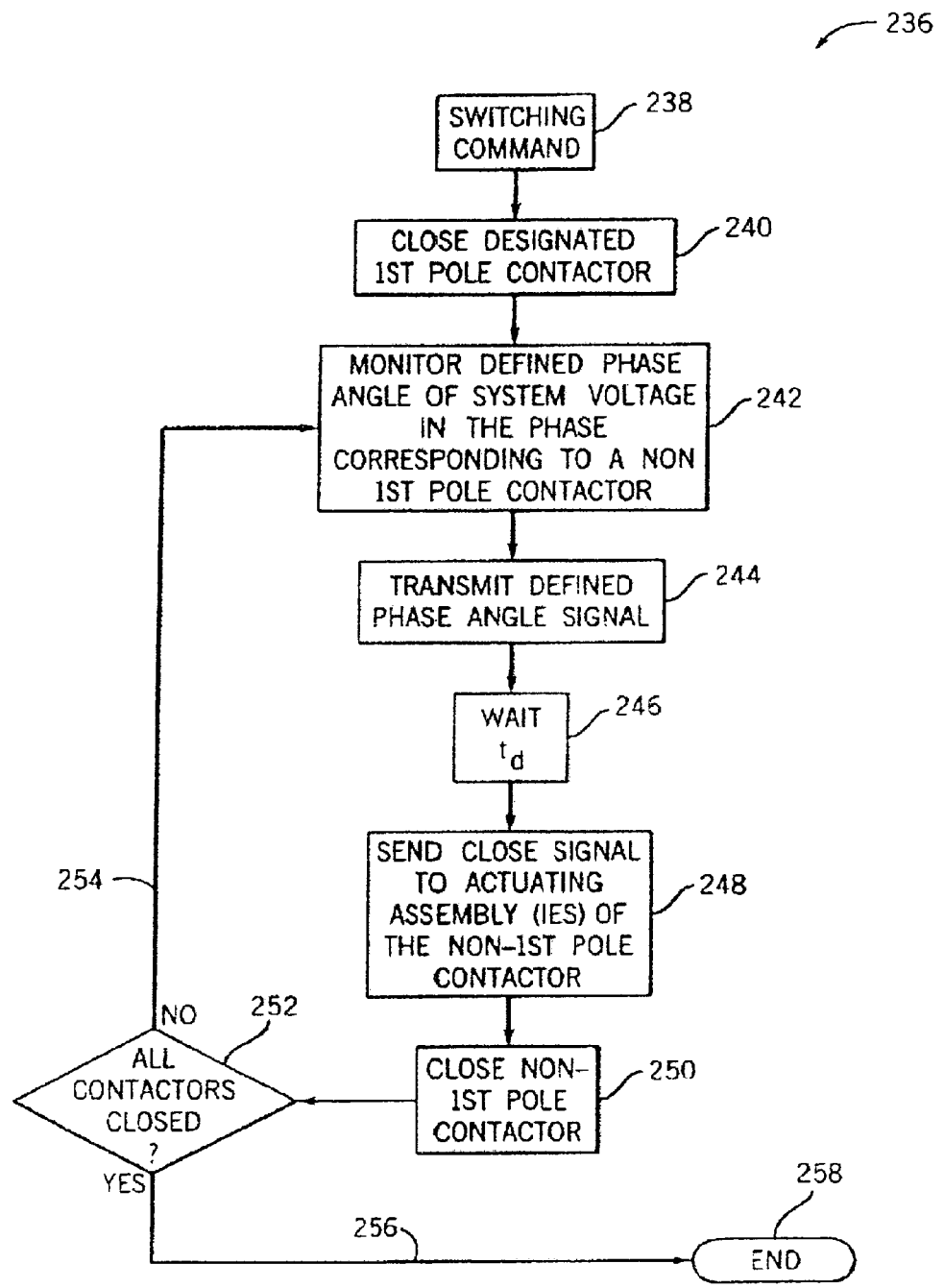
FIG. 12 is a flow chart setting forth the steps of a technique for independently controlling the closing of contactors of a modular contactor assembly in accordance with a further embodiment of the invention.

The steps of a technique or process of "making" or closing contactors independently of a modular or multi-contactor assembly are set forth in FIG. 12. The technique 236 begins at 238 with a switching command being sent from the controller to the actuating assembly or assemblies for the designated first pole contactor 238. As stated above, the designated first pole contactor may be closed independent of the specific phase angle of the system voltage because there is no current flowing through the contactor prior to its closing. Based upon the switching command, the actuating assembly for the designated first pole contactor causes the contacts within the contactor to close at 240. It should be noted that the present technique 236 may be implemented with a contactor having a single actuating assembly or more than one actuating assembly. Additionally, while it is preferred that each contactor includes multiple sets of contacts, the present technique 236 may be implemented with a contactor having a single set of contacts.

After the designated first pole contactor has closed 240, a defined phase angle of the system voltage in the phase corresponding to a non-first pole contactor is monitored at 242. By monitoring the phase in a non-first pole contactor, the non-first pole contactor may be closed at a specified point on the waveform. A signal indicative of the defined phase angle in the system voltage corresponding to the non-first pole contactor is transmitted to the controller at 244. The defined phase angle signal may be transmitted from a voltage sensor or other detection or sensory device. Upon receipt of the defined phase angle signal, the controller waits until expiration of a delay time at 246. The delay time, as discussed previously, is based on the amount of time required from the actuating assemblies of a contactor receiving a switching signal to the closing of the contacts in a contactor. Upon expiration of the time delay, the controller sends a close contact signal to the actuating assemblies of the non-first pole contactor 248 thereby causing the contacts of the non-first pole contactor to close at 250.

After the non-first pole contactor is closed at 250, a determination is made as to whether additional contactors remain open at 252. If all the contactors have not been closed 252, 254, the technique or process returns to step 242 and carries out the steps or functions previously described. However, if all the contactors of the contactor assembly have closed 252, 256, technique 236 ends at 258 with current flowing through each of the contactors. Preferably, at the conclusion of technique 236, the controller implements one of the techniques or processes previously described with respect to FIGS. 7, 8, or 9 to independently control the opening of the contactors of the contactor assembly when an open condition is desired.

Figure 13:
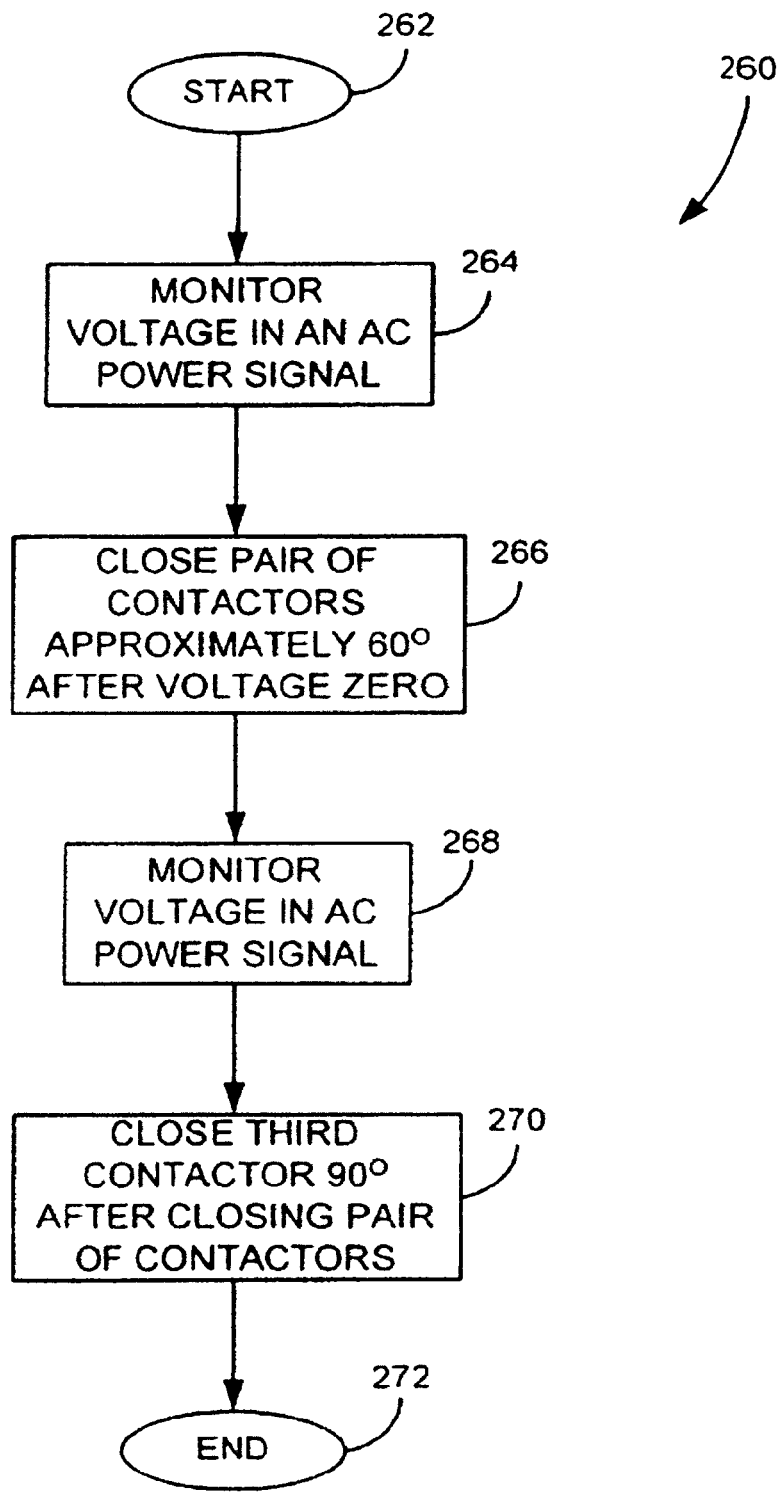
FIG. 13 is a flow chart setting forth the steps of another technique for independently controlling the closing of contactors of a modular contactor assembly in accordance with a further embodiment of the invention.

Referring now to FIG. 13, the steps of a technique or process of independent controlling the closing of contactors of a modular contactor assembly in a wye configuration in such a way as to minimize high transient current and the resultant negative torque oscillations is set forth. Technique 260 is applicable with a three-phase power source and may be used with a contactor assembly having three independent single pole contactors or, alternately, a two-pole contactor and a single-pole contactor preferably housed within a single contactor assembly housing. Technique 260 begins at 262, and at 264, voltage in an AC power signal is monitored. The AC power signal may be output from a utility line source or other type of power source, such as engine driven power sources. By monitoring voltage in the power source, precise point-on-wave closing of contactors may be achieved. That is, voltage of the power signal is monitored to determine a zero-crossing point. A pair of contactors is then caused to be closed by a common, or separate, actuating assembly, at a specified phase, preferably, approximately sixty degrees after the zero-crossing point 266. After the pair of contactors is closed, voltage in the power signal is again monitored at 268 such that a third contactor may be caused to close at a prescribed moment 270. Preferably, the prescribed moment is approximately ninety degrees after the closing of the pair of contactors. Delaying the closing of the third contactor until after the closing of the third contactor reduces negative torque oscillations in the system thereby reducing stress on the system.

Heretofore, a general process for asynchronously closing contactors based on POW control to reduce mechanical stresses on a load has been described. As will be further described below, such a process is particularly applicable to reduce transient currents, torque oscillations, and mechanical stresses in transitioning a load, such a polyphase induction motor. In this regard, transitioning includes controlling the load from a not powered to a powered condition, from a high to a low powered condition, from a low to a high powered condition, and from an ON to an OFF condition, or vice-versa, mode of operation. As such, the present invention may be applicable with starting an induction motor and transitioning that motor from a first mode of operation to a second mode of operation, such as from initial motor start-up to normal operating speed. Not only are torque oscillations and current transients reducible, but the present invention eliminates the need for transition resistors typically required for closed transition systems. Moreover, the present invention may significantly reduce surge currents typically encountered at motor start-up and that can interfere with other electrical equipment. Additionally, assembly costs typically associated with a wye-to-delta motor starter are reducible as a result of the ease of cabling individually controlled contactors. Simply, the individual contactors can be made to be physically aligned with the cable runs as opposed to the complexities encountered with using an in-unison three pole contactor. Further, the amount of heat dissipated during contactor closure is reduced given the timing of contactor closing which provides increased reliability. Additionally, the unprotected zone typically found between the protection afforded by a motor starter (typically 6-8 times of full load current) and that that of the circuit breaker is no longer necessary to accommodate the otherwise occurring high transient currents, or is at least not as pronounced as required with known motor starters.

The present invention reduces potentially damaging DC transients by implementing an asynchronous or multi-stage contactor closure strategy with back emf consideration to regulate voltage application to a polyphase power system such as the windings of an induction motor. Specifically, the DC transients may be reduced, if not eliminated, if the "switch-on" process is performed in multiple stages and, in one embodiment, two stages.

Figure 14:
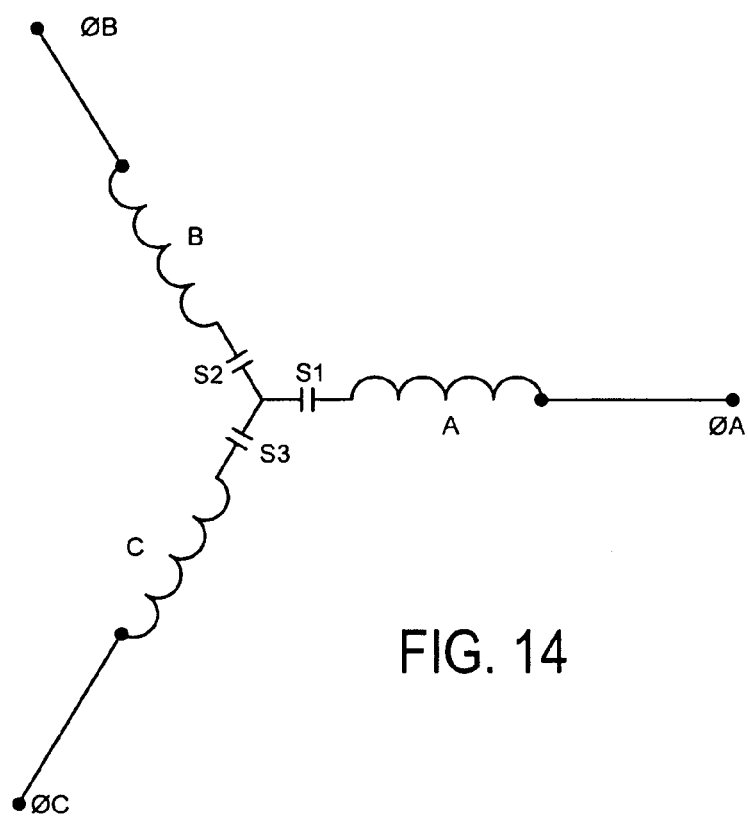
FIG. 14 is a schematic representation of a motor windings and contactors arrangement in a standard pole star or wye connection.

Referring now to FIG. 14, a high-level schematic representation of a starter and motor windings circuit using standard connections is shown. In starting a three-phase induction motor having three windings A,B, and C, in one embodiment, two contactors, generally referenced by S1 and S2, are closed at the peak of the line voltage $V_{ab}$. At closing of contactors S1 and S2, current will be caused to flow through windings A and B; however, current will not be caused to flow through contactor S3 to winding C as S3 remains open. Contactor S3 is closed when the line voltage $V_{ab}$ is at zero which is generally at or near ninety degrees in phase change after closure of contactors S1 and S2. Upon closure of contactor S3, current will begin to flow through winding C. At this moment, all three contactors are closed and all three windings are conductive. The motor is operating in a star or wye configuration.

Figure 15:
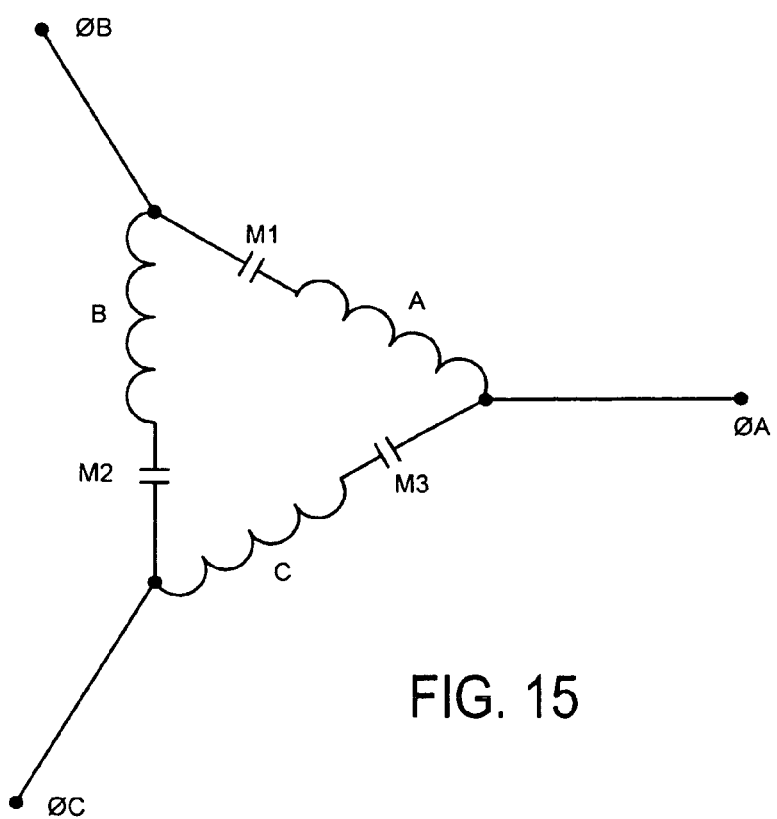
FIG. 15 is a schematic representation of a motor windings and contactors arrangement in a standard pole delta connection.

Now referring to FIG. 15, contactor re-closure or reconnection of the windings to the power supply is initiated in one embodiment after a period of emf decay when the line voltage $V_{ab}$ is at or near 60 degrees. At this time, only contactor M1 is closed such that only winding A is connected to ΦA and ΦB. At 180 degrees in phase change of the line voltage $V_{ab}$ (which will also be a voltage zero), contactors M2 and M3 are closed. As such, windings B and C will be connected to the power supply. In this regard, all the contactors and windings are conductive, and the motor is running in a delta configuration which is preferable for high speed motor operation.

Figure 16:
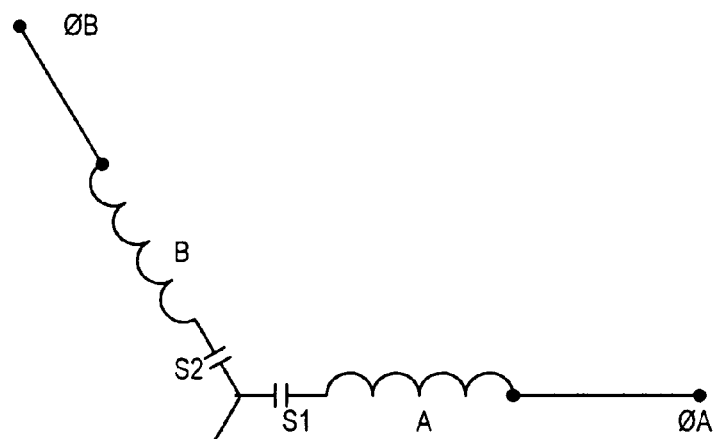
FIG. 16 is a schematic representation of a motor windings and contactors arrangement in a shifted pole star or wye connection.
Figure 17:
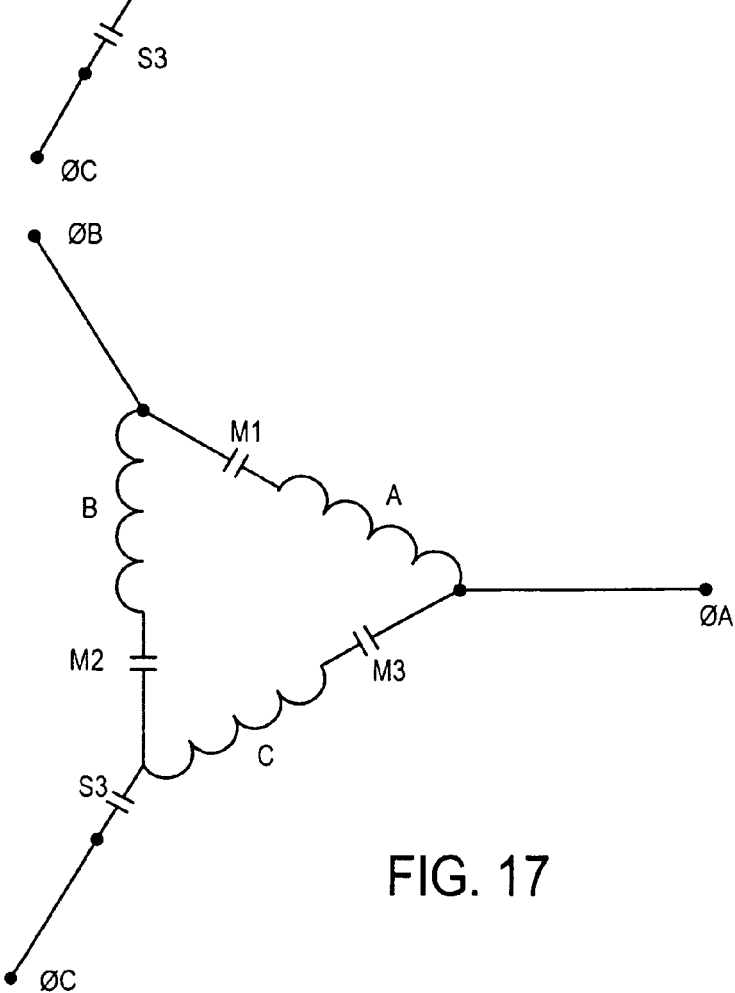
FIG. 17 is a schematic representation of a motor windings and contactors arrangement in a shifted pole delta connection.

The present invention is also applicable with non-standard connections such as those utilizing a shifted pole. Such a configuration is illustrated in FIGS. 16-17. While an asynchronous switching is implemented, for a shifted pole configuration, the manner of switching is different from that used for the standard connections illustrated in FIGS. 14-15.

Referring to FIG. 16, the windings are initially connected in a star or wye configuration, but with a shifted pole, which is S3 corresponding to ΦC in the illustrated example. Contactor closure for the shifted pole configuration may be similar to that described above with respect to a standard pole arrangement. Specifically, contactors S1 and S2 may be first closed when line voltage $V_{ab}$ is at or near its peak. When the line voltage $V_{ab}$ is at or near its zero, contactor S3 is closed resulting in the motor windings being connected in a star or wye configuration. In contrast to the previously described standard pole arrangement, however, reconnection in the delta configuration is different for shifted pole arrangements.

Referring now to FIG. 17, contactors S3, M1, M2, and M3 are initially open which occurs when it is determined that the motor is running at normal speed. Contactor M3 can be pre-closed at any time. The line voltage $V_{ab}$ is monitored and when the line voltage is at or near its peak after a period of emf decay, contactors M1 and M2 close. The closure of contactors M1 and M2 closes the delta configuration and reconnects windings A and B to the power supply. Thereafter, and preferably when the line voltage is at or near zero, contactor S3 closes to apply ΦC. Since contactor M3 has been pre-closed, closure of contactor S3 results in the motor running in delta.

Referring again to FIG. 14, stage one of multi-stage control without back emf considerations may be characterized by the supply of voltage at time t=0 to two terminals or windings A and B of a star or wye configured-motor. Voltage is applied to windings A and B upon closing of contactors S1 and S3 at the peak of the $V_{ab}$ line voltage. As a result, current flows through windings A and B, which causes a builds up of flux $\overline{\psi}_0$. Since contactor C is not closed, no current flows in winding C.

After ninety degrees in phase change of the line voltage from when contactors S1 and S2 were closed, the third contactor S3 is closed to allow current flow through winding C. At this moment all three windings are connected to the power supply, and the voltage space vector and initial flux built up as a result of contactors S1 and S2 being closed correspond to the correct steady state values without requiring any additional DC flux transient $\overline{\psi}_{DC}$. $\overline{\psi}_S(0)$ is the initial value of the steady state flux defined by $$\overline{\psi}(t) = -j\frac{\overline{u}_s(t)}{\omega}$$

and lags behind by ninety degrees. As a result, the voltage $\overline{u}_s(t)$ and the flux $\overline{\psi}(t)$ rotate in synchronicity ninety degrees apart in their steady state without torque pulsations or excessive peak currents.

Figure 18:
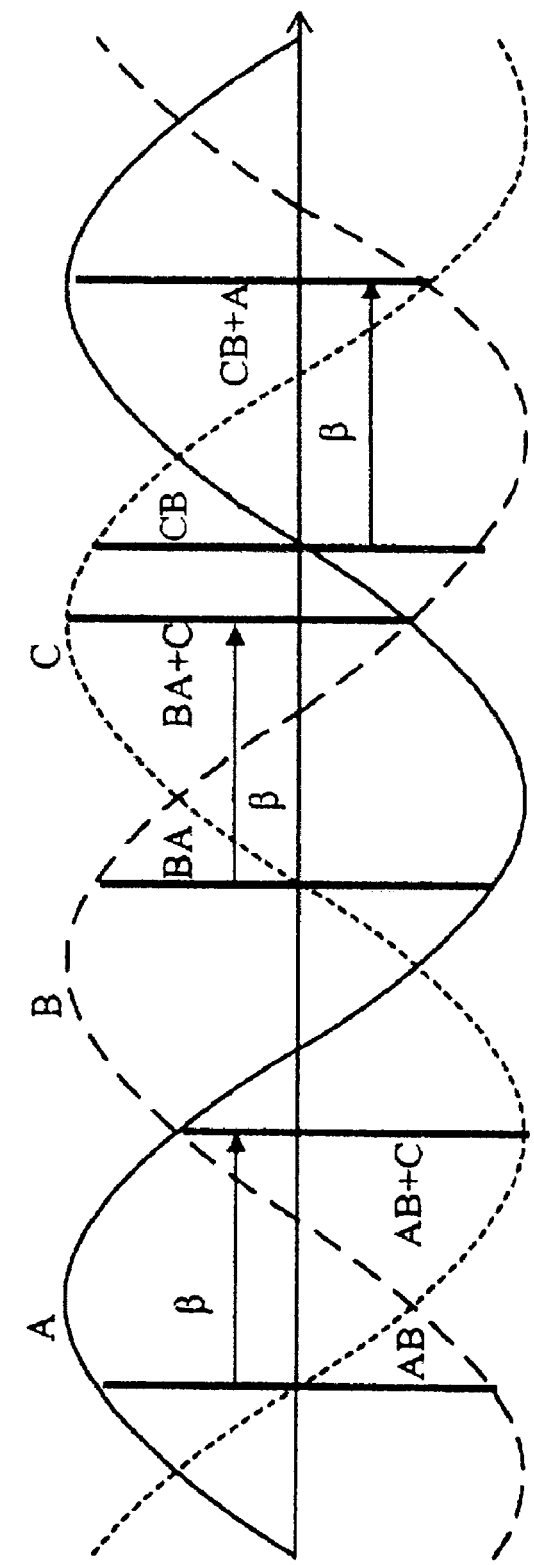
FIG. 18 illustrates phase voltage waveforms showing three alternative connection sequences for a two-stage contactor closing strategy in accordance with one aspect of the present invention.

Referring now to FIG. 18, phase voltage waveforms illustrating three alternative contactor connection sequences for a two-stage contactor "switch-on" in wye configuration are shown. The vertical lines denote the times when connection is made. AB means phases A and B are connected first, following by connection of phase C after a ninety degree delay β at AB+C.

The dq components of the voltage space vector applied to the motor may be derived as:

$$u_{SD} = \tfrac{2}{3}(u_{SA} - 0.5u_{SB} - 0.5u_{SC}) \quad \text{(Eqn. 9)}$$

$$u_{SQ} = 1/\sqrt{3}(u_{SB} - u_{SC}) \quad \text{(Eqn. 10)},$$

where $u_{SA}$, $u_{SB}$, and $u_{SC}$ are the voltages across the three windings. It therefore follows that the BA line voltage is given by, in terms of amplitude $u_S$ of the supply phase voltage by:

$$u_{BA} = \sqrt{3}u_S \sin(\omega t + \alpha) \quad \text{(Eqn. 11)}.$$

Assuming switch on at position BA where the line voltage $u_{BA}$ is at its peak, and setting time t=0 at that point, then α=270°. While only the A and B supply voltages are connected, and the C phase winding remains disconnected, the line voltage divides equally across the A and B windings, so that the winding voltages are given by $$u_{SA} = -\tfrac{1}{2}u_{AB},\; u_{SB} = \tfrac{1}{2}u_{AB},\; u_{SC}=0 \quad \text{(Eqn. 12)}.$$

Using Eqn. 10, the dq components are:

$$u_{SD}=0,\; u_{SQ}=-u_S \quad \text{(Eqn. 13)},$$

and $u_{SD}$ remains zero throughout the period β. Hence, during the 90° interval β before phase C is connected, the following is provided:

$$\frac{d\psi_Q}{dt} = u_{SQ} = -u_s\sin(\omega t + \alpha),\; \frac{d\psi_D}{dt} = u_{SD} = 0. \quad \text{(Eqn. 14)}$$

Integrating over the interval β to obtain the flux yields:

$$\psi_Q = -u_s \int_{\omega t=0}^{\omega t=\pi/2} \sin(\omega t + \alpha) dt, \quad \text{(Eqn. 15)}$$

so that when phase C is connected at ωt=β=π/2, then:

$$\psi_D = 0,\; \psi_Q = -\frac{u_s}{\omega}, \quad \text{(Eqn. 16)}$$

$$\overline{\psi}(\beta) = -j\frac{u_s}{\omega}. \quad \text{(Eqn. 17)}$$

This is the instantaneous steady state value $\overline{\psi}_0$ to enable starting without any decaying DC transient flux and associated torque pulsations and extreme current peaks.

Figure 19:
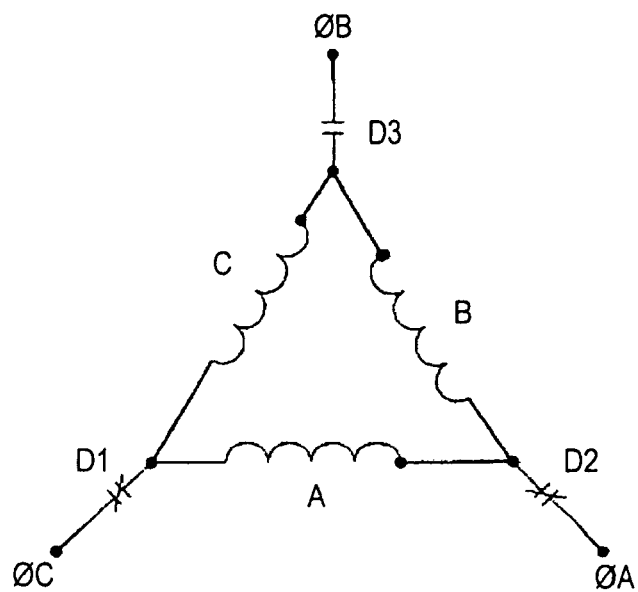
FIG. 19 is a schematic representation of a motor windings and contactors arrangement in a standard pole delta connection with the contactor poles external to the delta.

A similar analysis can be carried out to analyze the flux for a two stage motor connection in a delta configuration without back emf consideration. When connecting to a delta configured motor using two-stage switching without back emf consideration, if the contactor poles are external to the delta such as that illustrated in FIG. 19, then switching is done in a manner similar to that which was carried out for the star or wye connected motor described above. That is, by connecting two phases at their line voltage peaks via the closing of two contactors, e.g. D1 and D2, to connect phases A and B. The third phase B is then connected ninety degrees later by closing contactor D3.

The flux build up can then be calculated. The CA line voltage is:

$$u_{CA} = \sqrt{3}u_S \sin(\omega t + \pi/2) \quad \text{(Eqn. 18)},$$

and when the CA phases are connected at the moment t=0, $u_{CA}$ equals its peak voltage $\sqrt{3}u_S$. Since there is no connection to the B phase, the voltage across the three windings is given by:

$$u_{SA} = \sqrt{3}u_S \sin(\omega t + \pi/2) \quad \text{(Eqn. 19)},$$

$$u_{SB} = \sqrt{3/2}\,u_S \sin(\omega t + \pi/2) \quad \text{(Eqn. 20), and}$$

$$u_{SC} = u_{SB} \quad \text{(Eqn. 21)}.$$

Hence, from the dq voltage equations:

$$u_{SD} = \sqrt{3}u_S \quad \text{(Eqn. 22)}$$

$$u_{SQ} = 0 \quad \text{(Eqn. 23)}.$$

Integrating the flux build up for the ninety degree period until phase B is connected yields:

$$\psi_{SD} = \quad \text{(Eqn. 24)}$$
$$\int_0^{\omega t=\pi/2} u_{SD} dt = \sqrt{3}\,u_s \int_0^{\omega t=\pi/2} \sin(\omega t + \pi/2) dt = \sqrt{3}\,u_s/\omega.$$

This is the instantaneous steady state value $\overline{\psi}_0$ required to enable starting without any decaying DC transient.

Figure 20:
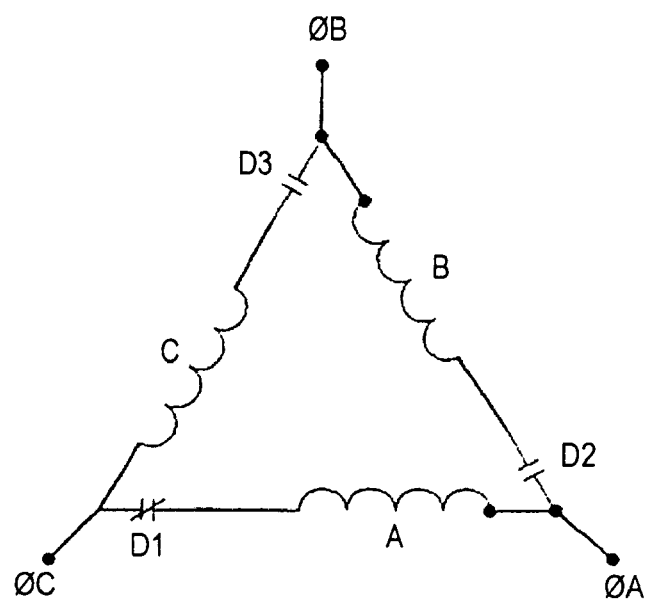
FIG. 20 is a schematic representation of a motor windings and contactors arrangement in a standard pole delta connection with the contactor poles internal to the delta.

Referring now to FIG. 20, if the contactor poles for delta operation are placed within the delta (as is the industry standard for star/wye-delta starting), it is not possible to isolate a supply phase completely from the windings. In this case, the first stage connection can be preformed by closing only one contactor to build up flux using only one winding (contact D1 in FIG. 20 to allow current to winding A).

Because no current flows in the B and C windings, flux must be built up over a longer period β=120° starting at 60° phase angle of the line voltage $u_{CA}$, rather than for β=90° starting at the voltage peak. The winding voltages with the line voltage $u_{CA}$ applied across the A winding are thus given by:

$$u_{SA} = \sqrt{3} u_S \sin \omega t, \; u_{SB}=0, \; u_{SC}=0 \quad \text{(Eqn. 25)},$$

which results in the dq space vector voltages being:

$$u_{SD} = \frac{2}{3}\sqrt{3}\, u_S \sin \omega t \text{ and} \quad \text{(Eqn. 26)}$$

$$u_{SQ} = 0 \quad \text{(Eqn. 27)}$$

Hence, by integrating over period β, the flux becomes:

$$\psi_{SD} = \int_{\pi/3}^{\pi} u_{SD}\, dt = \sqrt{3}\, \frac{u_S}{\omega} \text{ and} \quad \text{(Eqn. 28)}$$

$$\psi_{SQ} = 0. \quad \text{(Eqn. 29)}$$

This is the flux and orientation to enable contactors D2 and D3 to be closed at the zero crossing of the CA line voltage to apply full voltage to all windings of the motor without any or reduced DC transients.

Figure 21:
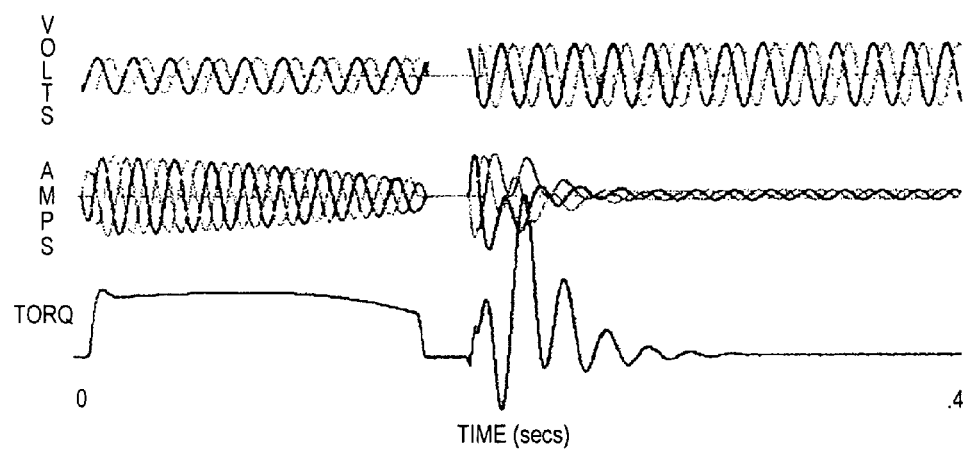
FIG. 21 illustrates voltage, current, and resulting torque pulsation amplitude over time for two-stage asynchronous controlling of an exemplary motor with its windings first connected in a star or wye configuration and subsequent reconnection of the windings in a delta configuration without time for back or rotor emf to decay.
Figure 38:
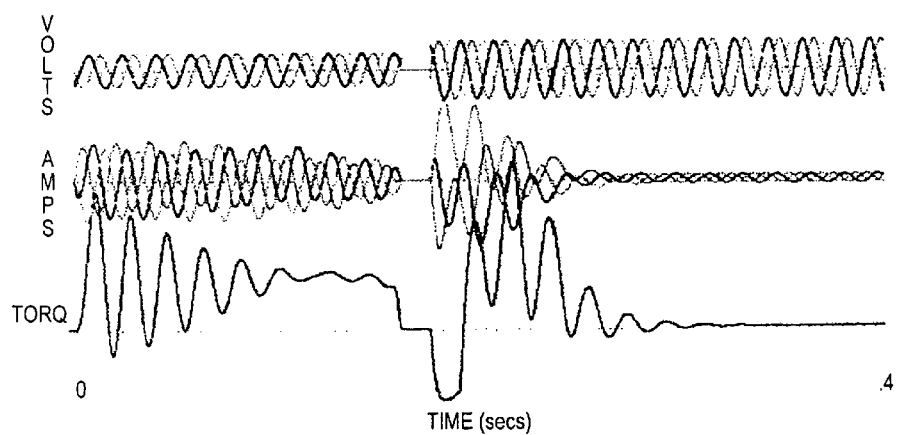
FIG. 38 illustrates voltage, current, and resulting torque pulsation amplitude over time for starting of an exemplary motor with simultaneous closure of contactor poles in a star or wye configuration and subsequent reconnection of the windings in a delta configuration.
Figure 39:
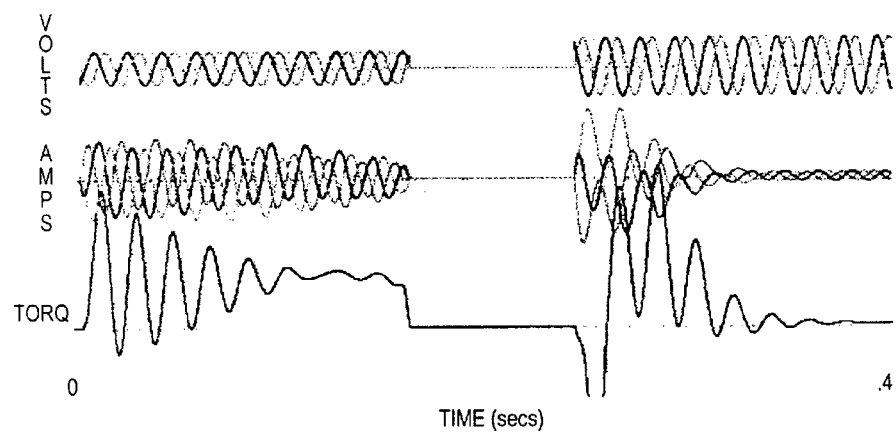
FIG. 39 illustrates voltage, current, and resulting torque pulsation amplitude over time for starting of an exemplary motor with simultaneous closure of contactor poles in a star or wye configuration and subsequent reconnection of the windings in a delta configuration after a ninety percent decay in back or rotor emf.

While one skilled in the art will readily appreciate that numerous advancements are recognized and achieved by the multi-stage switching protocol described with respect to FIGS. 14-20, in this embodiment of the invention, back emf of the motor after disconnection from the power supply was not considered. As such, pulsation at undesirable levels may occur at the reconnection of the motor windings in the delta configuration, as illustrated in FIG. 21. It should be noted, however, that the torque oscillations experienced with the multi-stage re-closure in delta is less than that experienced with single stage or simultaneous closure, which is illustrated in FIG. 38. Moreover, the torque oscillations experienced with the two stage process described above that fails to account for back emf effects are less pronounced than with the single stage, emf considered process, the results of which are illustrated in FIG. 39.

Figure 22:
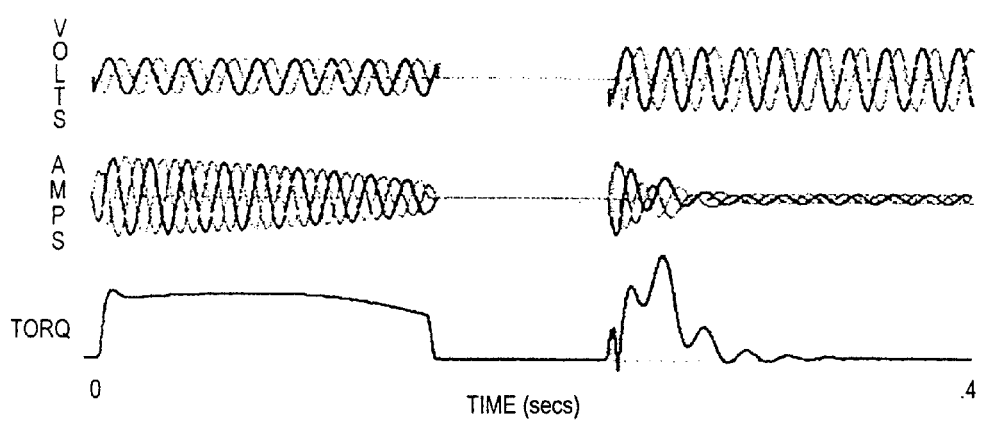
FIG. 22 illustrates voltage, current, and resulting torque pulsation amplitude over time for two-stage stage asynchronous controlling of an exemplary motor with its windings first connected in a star or wye configuration and subsequent reconnection of the windings in a delta configuration with consideration for back or rotor emf decay.

Therefore, in one embodiment, the present invention includes a multi-stage contactor closure strategy for star/wye-delta transitions that takes into account back emf to further reduce torque oscillations, transient currents, and, ultimately, mechanical stresses. The effects of allowing emf to decay coupled with a two-stage contactor closure with delay for a star-delta start is illustrated in FIG. 22. As shown, torque pulsation is greatly reduced following delta reconnection, and negative torque is virtually eliminated when compared to known star-delta starting such as those illustrated in FIGS. 38 and 39.

Referring now to FIGS. 23-35, a motor control process that includes software routines, subroutines, and interrupts for carrying out a POW, wye/star-delta, multi-stage strategy with closure delay, and with synchronization of back emf phase and line voltage phase will be described. One skilled in the art will recognize that the routines, subroutines, and interrupts may be carried out using software, hardware, firmware, and combinations thereof. Additionally, the control process has sufficient flexibility to be workable with several starters having different functional goals. In this regard, to meet the demands of a particular starter, some of the routines and subroutines may be disabled. Also, as will be described, overall timing of the process is governed by a phase locked loop (PLL) interrupt routine that locks to the zero crossings of a line voltage, such as the $V_{ab}$ line voltage, which occurs every 360 degrees in voltage phase, i.e. at times t0, t2, t4, ... $t_n$. Further, the process includes a Mains Loss test incorporated with the PLL routine and is designed to detect or otherwise determine a main power loss within two or three cycles. As such, the contactors can be timely opened to prevent large impulse torque and transient currents that may occur as a result of reconnection of the power supply when back emf is out of phase with the power supply.

Figure 23:
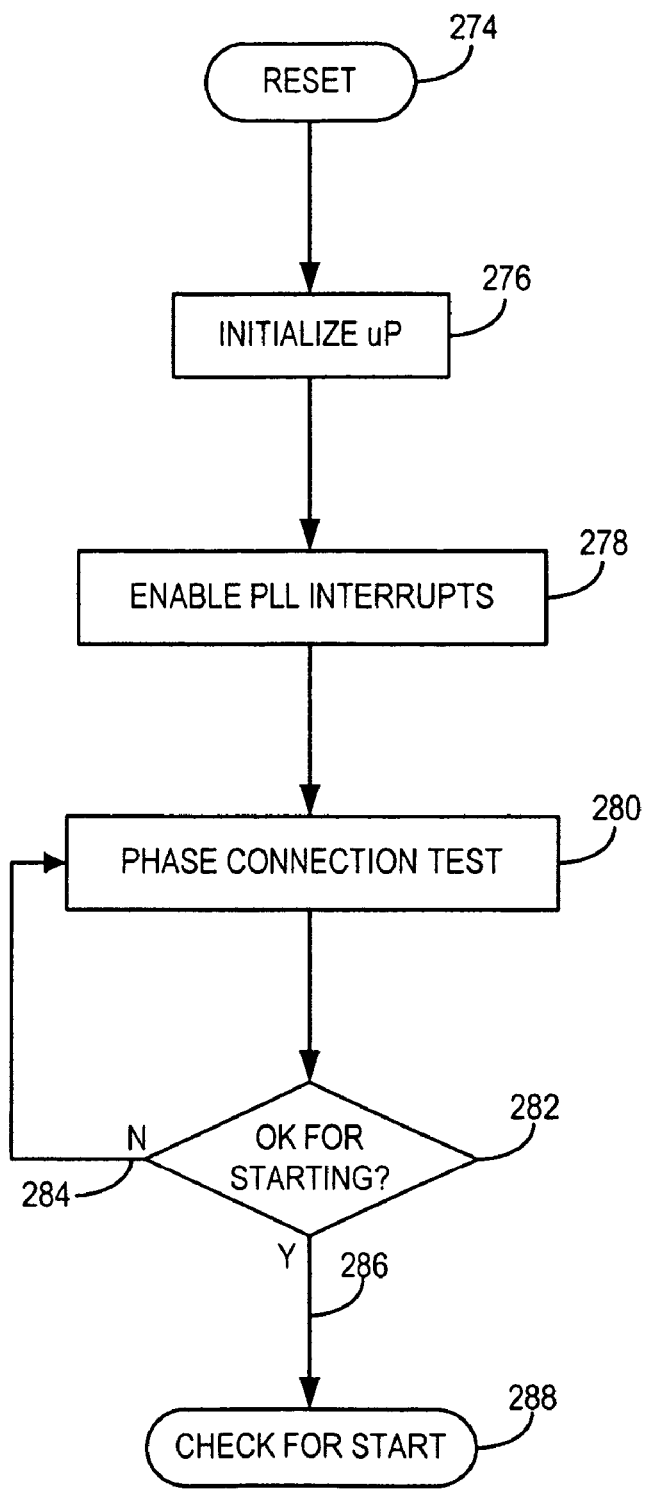
FIG. 23 sets forth the steps of a RESET routine that is carried out at motor start-up.

Referring now to FIG. 23, the motor control process begins with the carrying out of a RESET routine 274. It is assumed that before the motor is started that a three-phase power supply and a 24VDC control power have been connected. The RESET routine 274 initializes one or more microprocessors at 276 that will electronically monitor and control the motor control process. The PLL interrupts are enabled at 278 and a phase connection test is carried out at 280.

Figure 24:
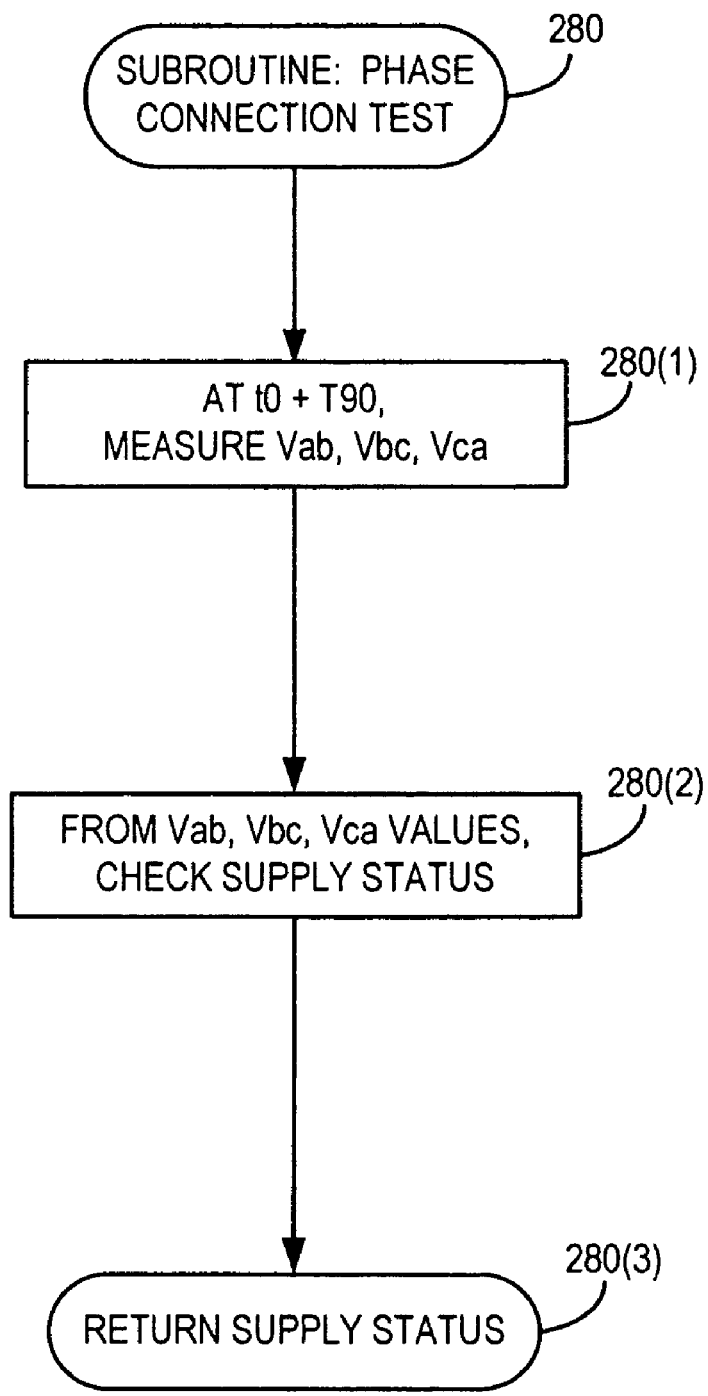
FIG. 24 sets forth the steps of a Phase Connection Test subroutine that is carried in accordance with one aspect of the invention.

Referring to FIG. 24, the phase connection test 280 is executed by a phase connection and rotation test subroutine that measures at 280(1) the line voltages at ninety degrees in phase after a specified line voltage, i.e. Vab, crosses zero at time equal to t0+T90. The phase connection subroutine 280 is designed to verify that the specified line voltage reaches its peak at or near ninety degrees after its zero crossing 280(2). Subroutine also verifies at 280(2) that the line voltages across the other windings are equal to one another when the specified line voltage is at its peak, and at one-half the magnitude of the specified line voltage's peak, but with a sign change. Subroutine 280 then returns the supply status data 280(3) to the microprocessor, whereupon the control process, as shown in FIG. 23, determines if conditions are suitable for motor starting 282. If not 282, 284, the RESET routine recycles back to the phase connection test at 280 and awaits output indicative of suitable motor starting conditions. Once suitable starting conditions are deemed present 282, 286, the RESET routine passes control to a Check for Start routine at 288.

Figure 25:
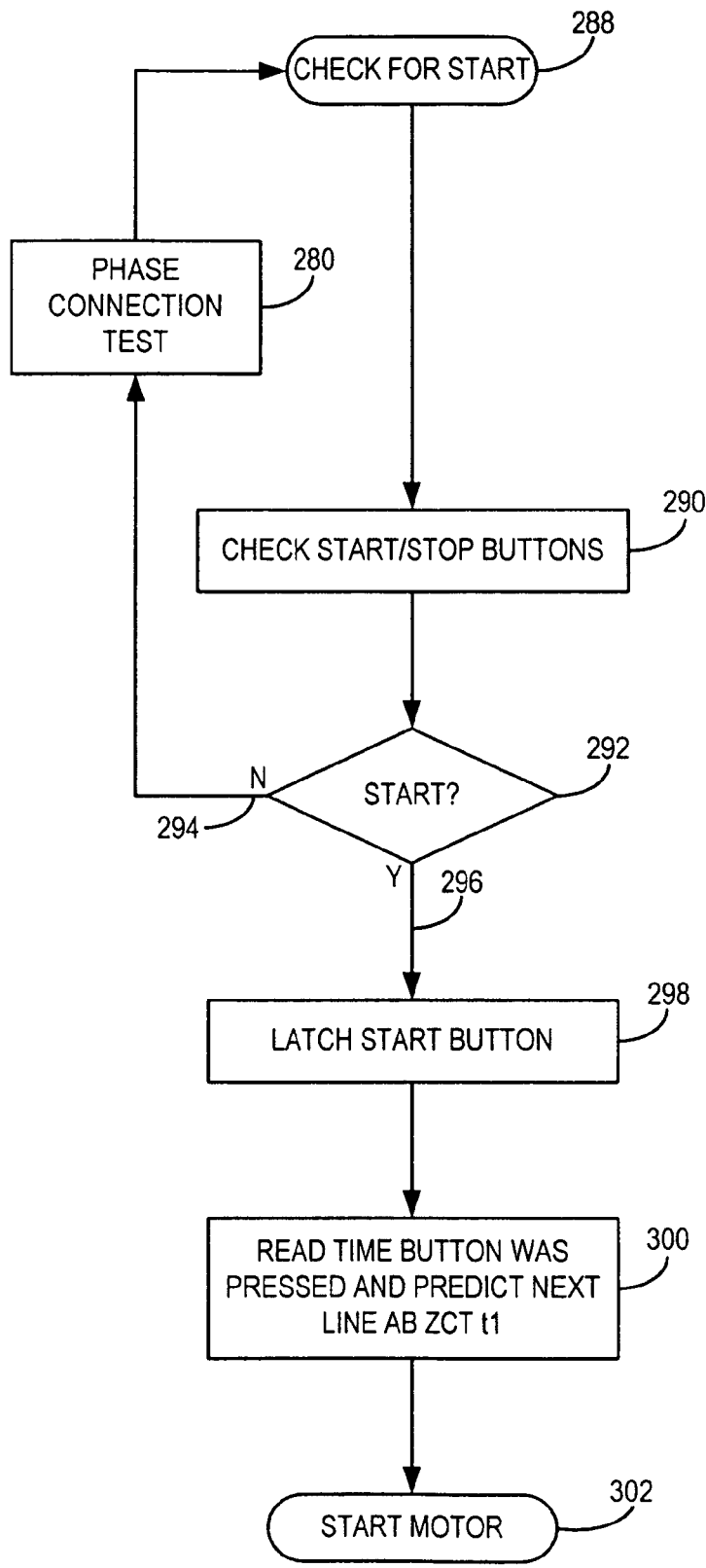
FIG. 25 sets forth the steps of a Check for Start routine that is carried out before motor starting in accordance with another aspect of the invention.
Figure 26:
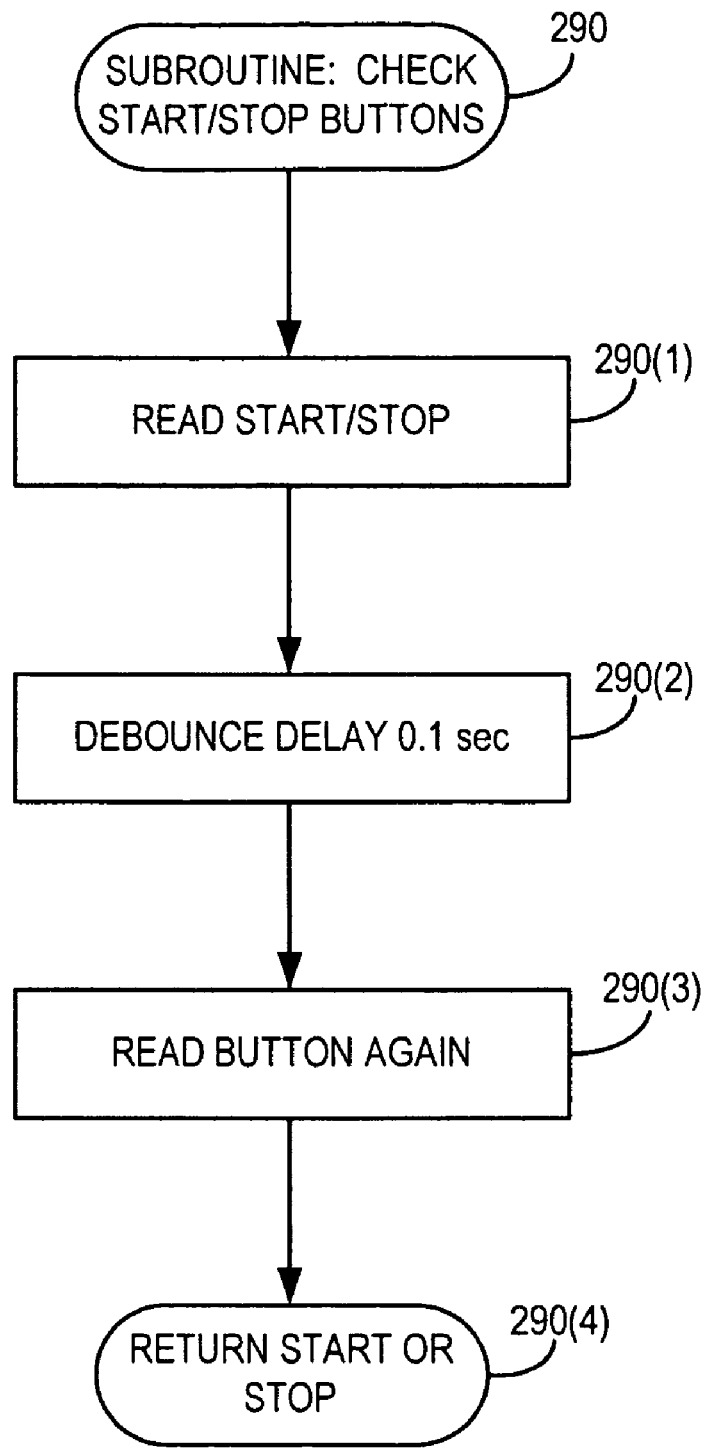
FIG. 26 sets forth the steps of a Check Start/Stop Buttons subroutine that is carried out to confirm user selection of motor start-up or shut down command in accordance with another aspect of the invention.

The steps of the Check for Start routine 288 are shown in FIG. 25. Routine 288 proceeds to execute Check Start/Stop buttons subroutine at 290. Subroutine 290, the steps of which are shown in FIG. 26, reads the Start/Stop buttons 290(1) on the motor and/or starter to eliminate misreading. After a debounce delay 290(2), the Start/Stop buttons are read again 290(3) to confirm the initial reading determined at 290(1). Subroutine then returns the appropriate START or STOP command 290(4) to the Check for Start routine 288.

Referring back to FIG. 25, the output of subroutine 290 is evaluated to determine if a START command has been given 292. If not 292, 294, routine 288 loops back to the phase connection test 280 described in FIG. 24. If a START command has been deemed given 292, 296, the start button is latched 298 and the microprocessor or other sensory device determines the time when the START button was selected and predicts the next zero crossing of the specified line voltage 300. Thereafter, routine 288 relinquishes control to a Start Motor routine 302.

Figure 27:
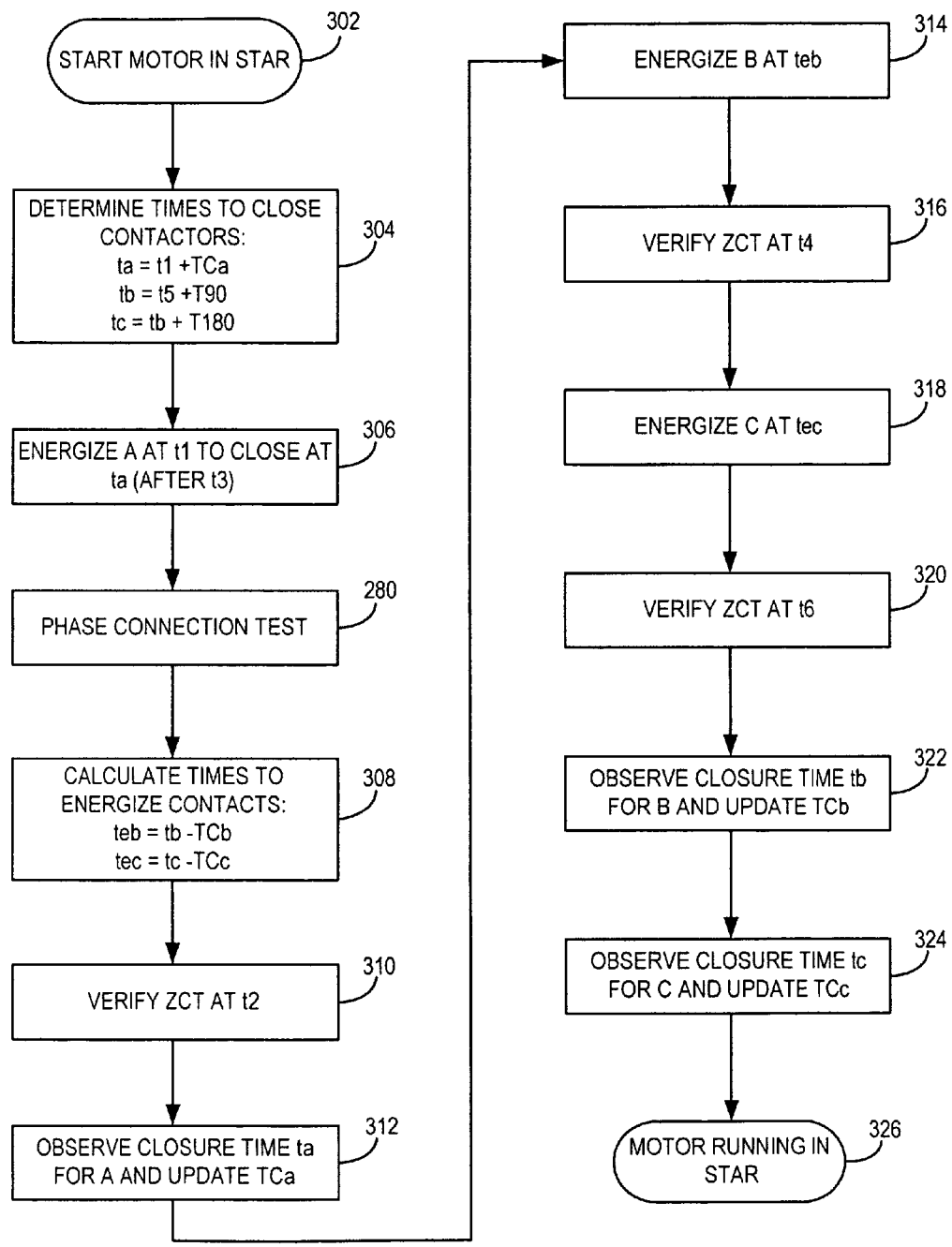
FIG. 27 sets forth the steps of a Star Motor in Star routine that is executed to asynchronously connect windings of a motor to a power supply in accordance with yet another aspect of the invention.

Referring now to FIG. 27, Start Motor routine 302 is entered when the START button has been deemed selected. For a star/wye-delta start, routine 302 is executed to start the motor with its windings in a star or wye configuration. To first start the motor in a wye/star configuration, times to close the contactors are determined at 304. As set forth above, the contactors are not closed simultaneously, but in phase sequence such as A, B and C or C, A and B. The designated first pole contactor is then energized at 306 to close at some moment later. That is, there is delay from whence the contactor is energized to ultimate contactor closure. After the first pole contactor is energized 306, the phase connection test subroutine 280 (FIG. 24) is executed again to measure line voltages at ninety degrees in phase change of the specified line voltage. From the measured voltages, routine 302 continues with the determination of the times to energize the contactors for the other stator windings 308 in phase sequence. Since the phase of the specified line voltage should cross zero every 180 degrees in phase change, a determination is made at 310 to verify a properly timed zero crossing 180 degrees in phase change since the first pole contactor was energized for closure.

The closure time of the first pole contactor is then observed at 312. After closure of the designated first pole contactor, the second designated contactor is energized for closure at 314. A zero crossing is then observed at 316 followed by energization of the designated third contactor for closure 318. Another zero crossing is again determined at 320 followed by closure of the designated second pole contactor 322. The third pole contactor is closed thereafter at 324 whereupon the motor is running with all its windings connected, and connected in a star or wye configuration 326.

Figure 28:
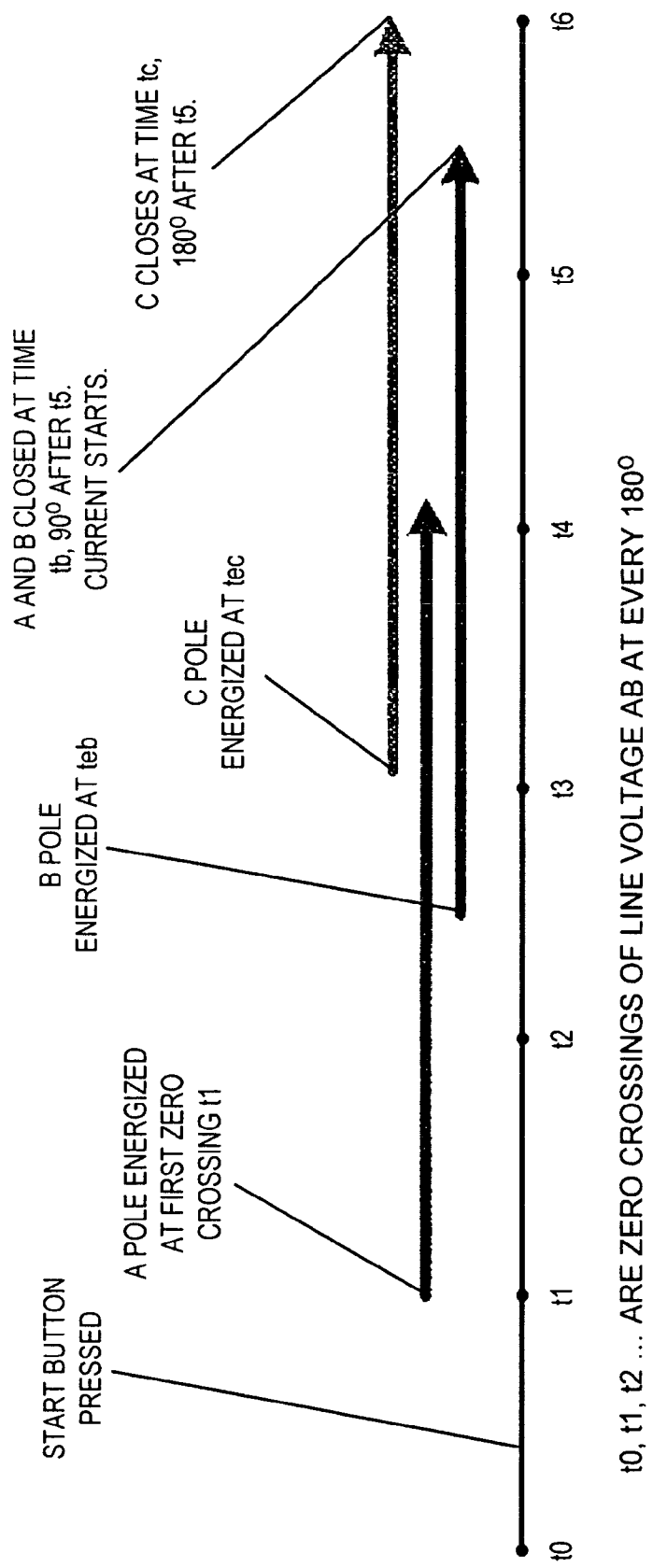
FIG. 28 is a timing diagram illustrating non-simultaneous contactor closure to connect windings of a motor in a wye or star configuration in accordance with another aspect of the invention.

The timing of contactor closure for starting of the motor in a star or wye configuration is particularly illustrated in the timing diagram of FIG. 28. As illustrated, at time t1 for the next supply zero after t0, the contactor for the A pole is energized. Then the contactor for the B pole is energized after the zero crossing at t2 so that it will close at the peak of the AB line voltage at time tb t5+90) degrees. Since it takes TCb to close the contactor, energization preferably occurs at time tb−TCb. The contactor for pole C is energized at tec=tc−TCc so as to close ninety degrees later at time tc=tb+90 degs.

Figure 29:
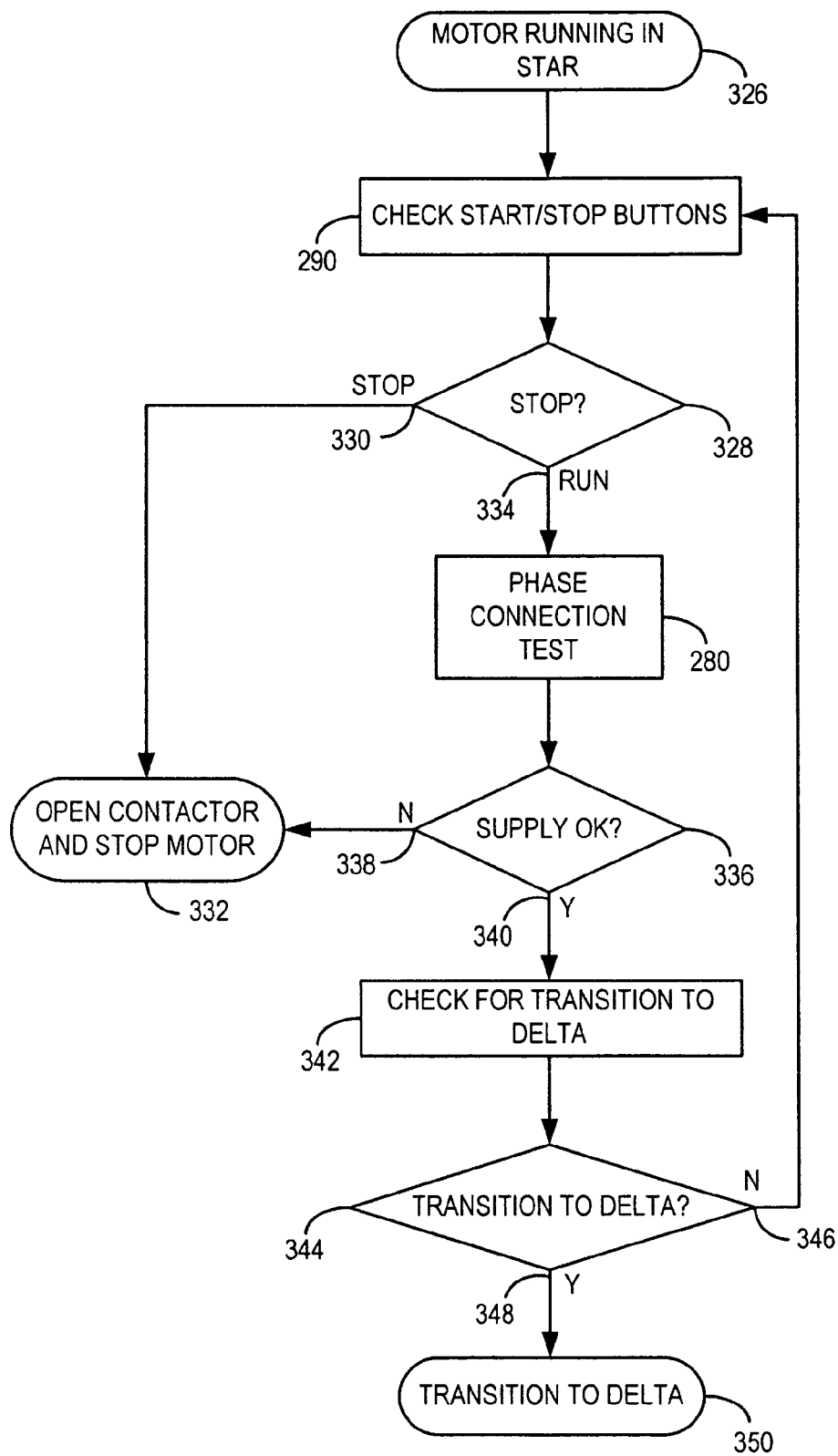
FIG. 29 sets forth the steps of a Motor Running in Star routine that is executed when a motor is running with its windings connected in a star or wye configuration in accordance with another aspect of the invention.

When the motor is started in the star or wye configuration, control passes from routine 202 to a Motor Running in Star routine 326, FIG. 29. In the star or wye configuration, the motor accelerates up to speed and continues running until a STOP command is received or the microprocessor determines that a switch-over to a delta configuration is warranted. Specifically, routine 326 executes the Check Start/Stop Buttons routine 290 of FIG. 26 and if a STOP command is received 328, 330, the contactors are all opened independently to reduce arcing and the like as described above with respect to contactor opening and the motor is stopped. Until a STOP command is received, routine 326 continues with motor running 334.

Routine 326 also interfaces with the Phase Connection Test routine 280 of FIG. 24 to verify that the supply voltages are acceptable. If not 336, 338, the contactors are independently opened and the motor is shut-down. If the supply voltages are acceptable 336, 340, the motor continues to accelerate up to normal operating speed. In this regard, routine 326 executes a Check for Transition to Delta subroutine 342 that is designed to determine if motor conditions warrant initializing transition from the wye to the delta configuration.

Figure 30:
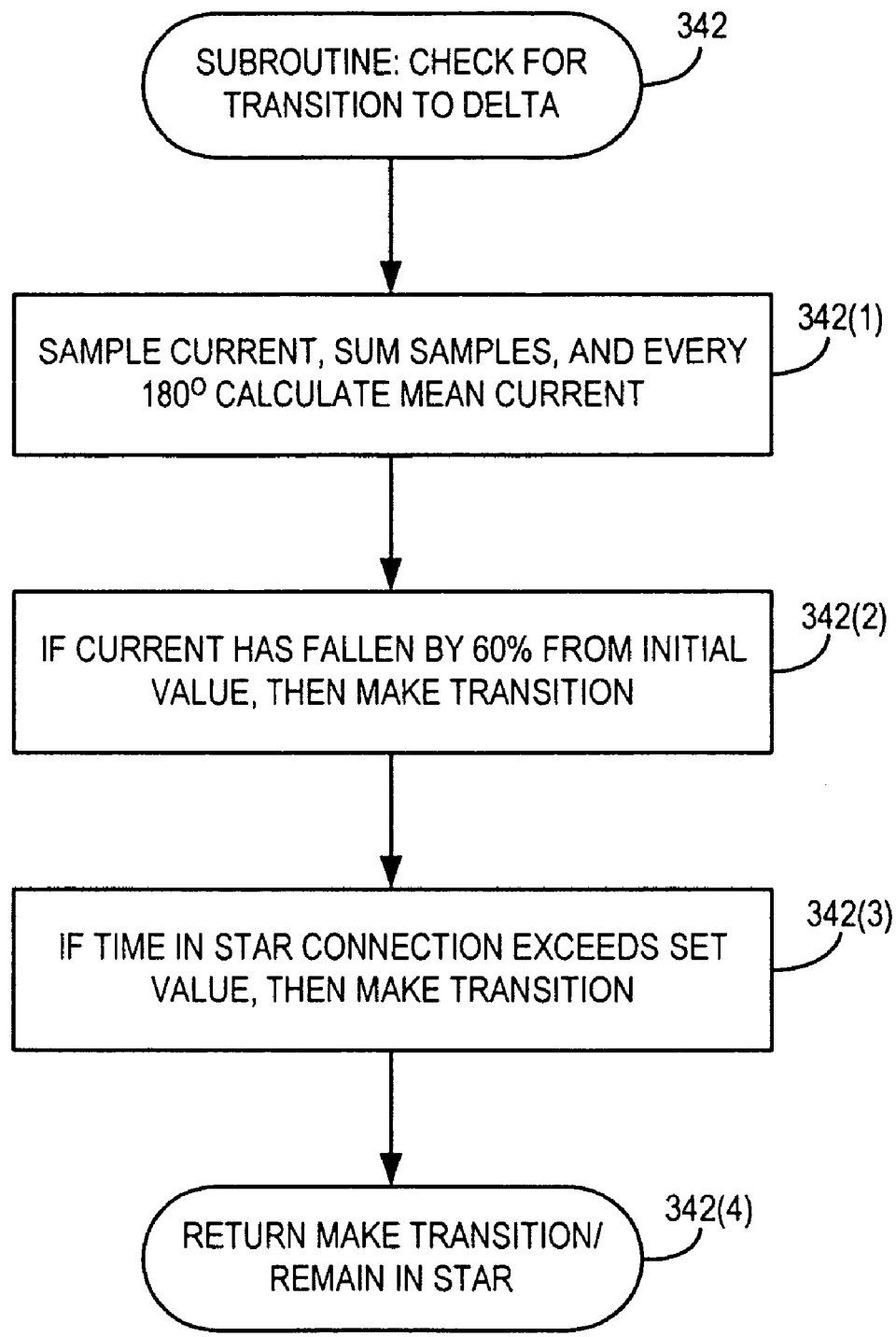
FIG. 30 sets forth the steps of a Check for Transition to Delta subroutine that is execute to determine ripeness for transition from a first mode of motor operation to another mode of operation in accordance with a further aspect of the invention.

Referring now to FIG. 30, subroutine 342 samples current, sums samples, and determines mean current values preferably every 180 degrees in phase change of the specified line voltage 342(1). In this regard, subroutine 342 determines if motor current has reached a given threshold 342(2). In one embodiment, when motor current has fallen by sixty percent (60%) of its initial value, then conditions are appropriate for the star-delta transition. It is contemplated that motor speed could also be monitored to determine if conditions are ripe for the star-delta transition. In addition, a timer may also be used. In this regard, if the load on the motor is too great to permit current to fall to the given value, the transition to delta may be initiated if a fixed time has elapsed 342(3). Accordingly, subroutine 342 outputs either a make transition or remain in star command 342(4).

Referring back to FIG. 29, from the output of subroutine 342, the motor control process determines if a transition to delta command has been received 344. If not 344, 346, the process re-loops back to the Check Star/Stop Buttons routine 290. If a transition to delta command is received 344, 348, the process proceeds to a Transition to Delta subroutine 350.

Figure 31:
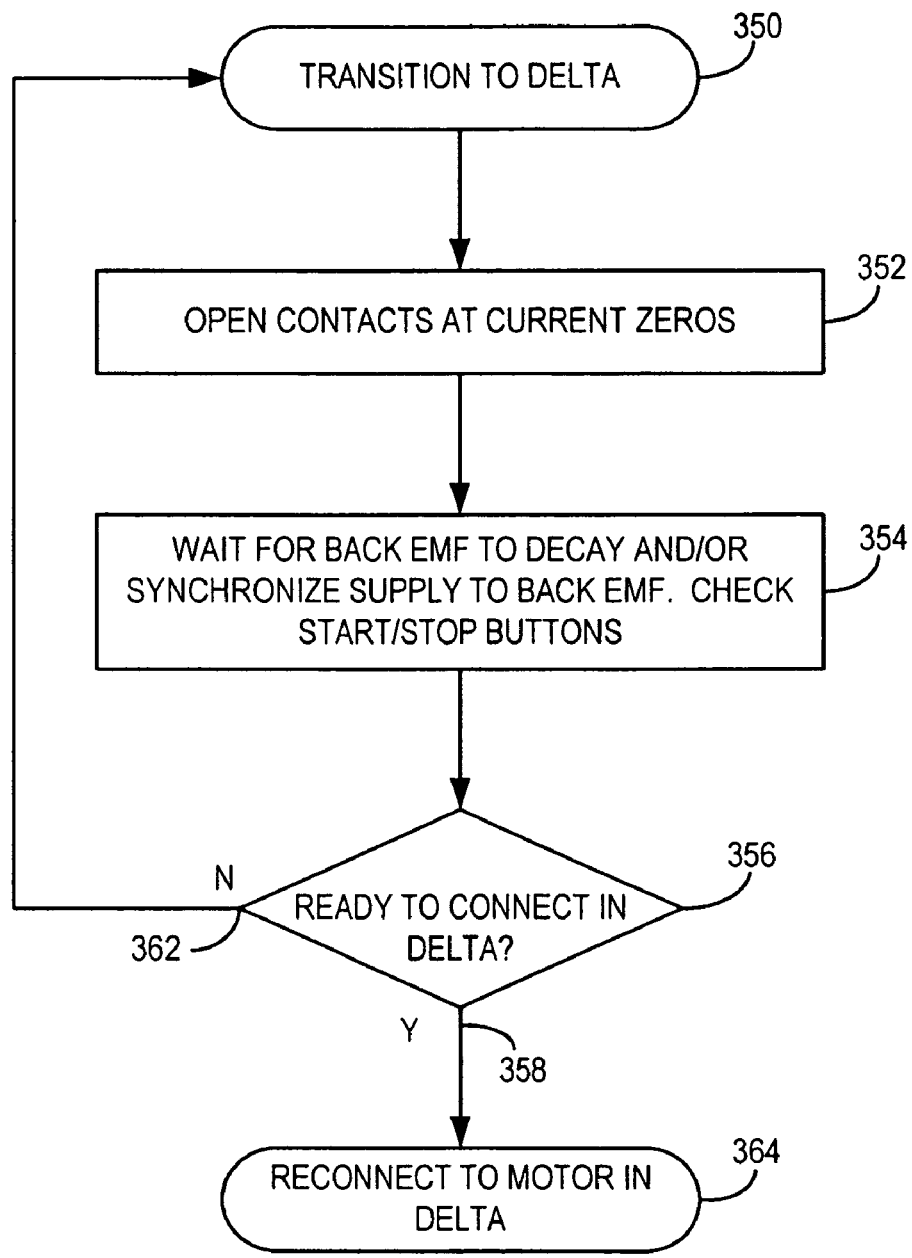
FIG. 31 sets forth the steps of a Transition to Delta subroutine that is executed to switch the windings of a motor from a star or wye configuration to a delta configuration in accordance with another aspect of the invention.

Referring now to FIG. 31, the Transition to Delta subroutine 350 begins the transition from a star to delta windings configuration with the non-simultaneous opening or breaking of the contactors at 352 in a manner described above. Once the contactors are opened 352, subroutine 350 executes a Wait for Back Emf subroutine 354. As will be described, subroutine 354 is designed to reduce transient peak currents and torque pulsations when the windings are reconnected to the power supply in a delta configuration. Subroutine 354 either waits for the back emf to decay or observes the decaying back emf generated across one motor winding and waits until the back emf and supply voltage phases are synchronized before permitting reconnection of the supply. Once conditions between the back emf and supply voltage are appropriate for reconnection of the windings 356, 358, control is passed to a Reconnect Motor in Delta routine 360. If the conditions are not appropriate for motor reconnection 356, 362, subroutine 350 is re-executed until the appropriate conditions are deemed present.

Figure 32:
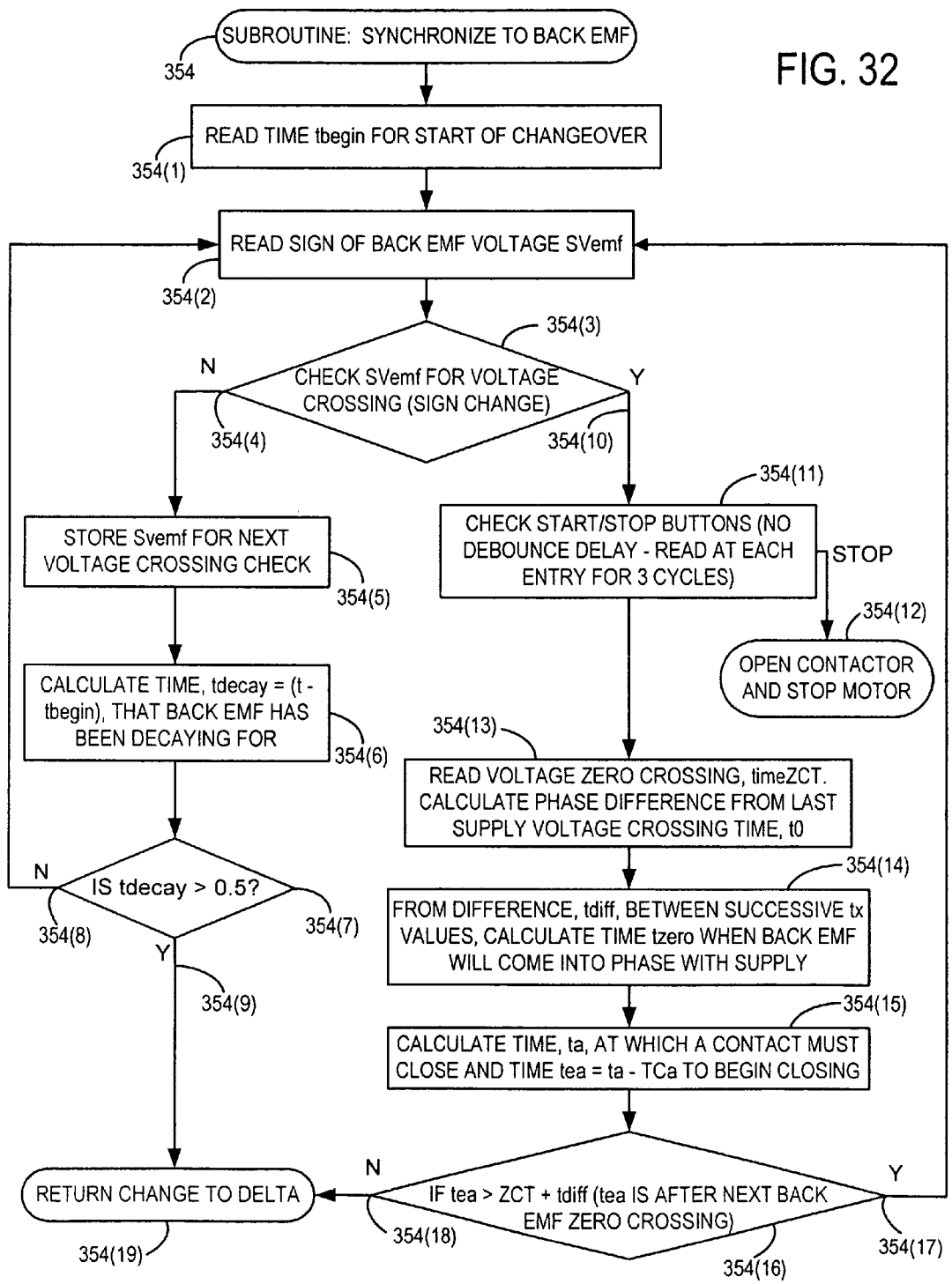
FIG. 32 sets forth the steps of a Wait for Emf subroutine that is carried out in accordance with another aspect of the invention to allow motor back emf to decay or synchronize with power supply voltage.
Figure 33:
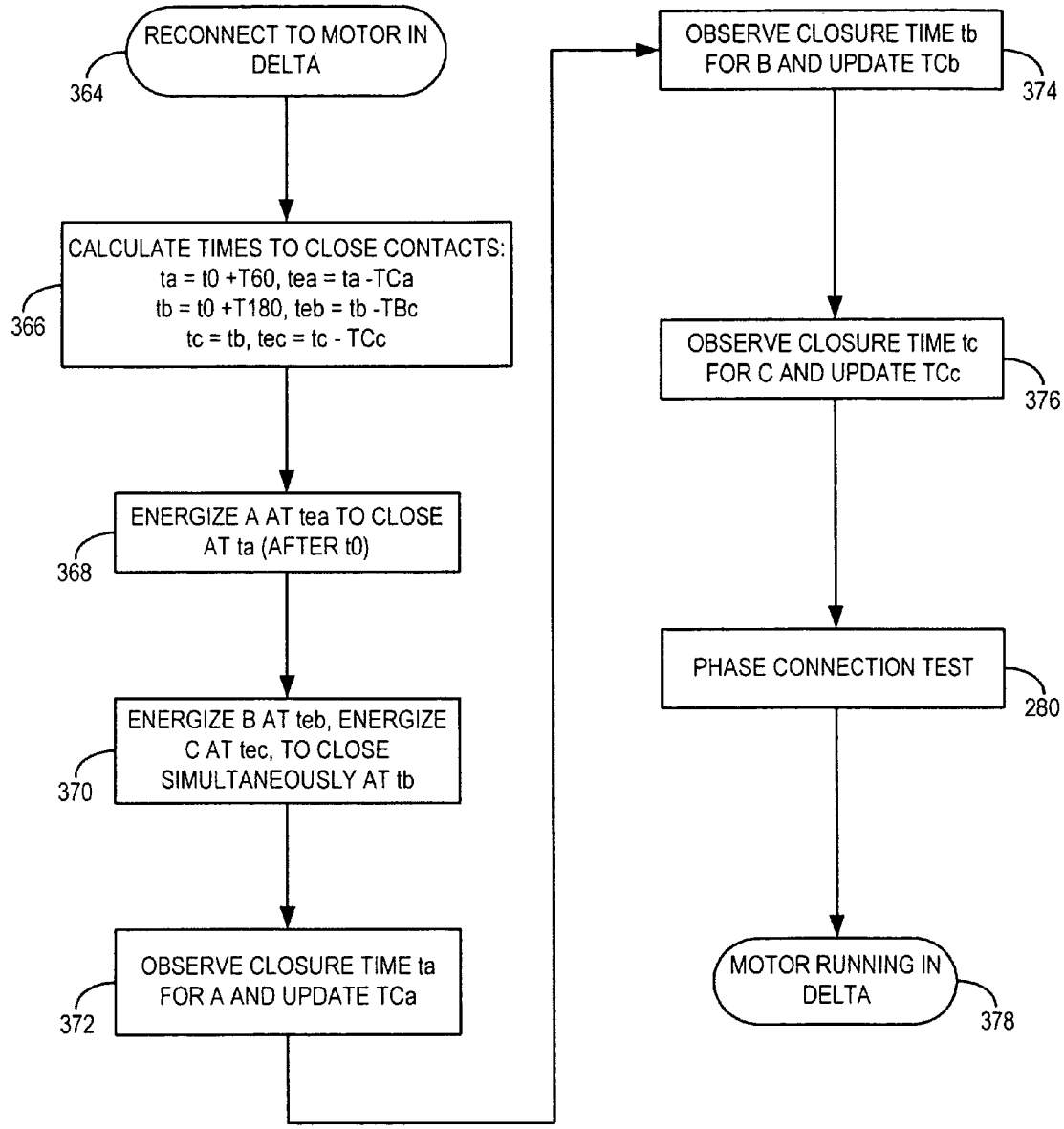
FIG. 33 sets forth the steps of a Reconnect to Motor in Delta routine that is carried out to asynchronously connect the windings of a motor in a delta configuration after emf decay or power supply synchronization according to another aspect of the invention.

Referring to FIG. 32, the steps carried out in accordance with the Wait for Back Emf subroutine 354 are set forth. Subroutine 354 begins with initiating a timer at the start of the configuration switch-over 354(1). To determine back emf zero crossings, the back emf voltage across a given stator winding is monitored 354(2). To determine the zero crossing, the sign of the voltage is observed. Accordingly, at 354(3), the back emf voltage across a given stator winding is monitored to determine the presence of a sign change. If there is not a sign change 354(3), 354(4), the amplitude of the voltage is stored for next voltage crossing check 354(5). Thereafter, the time since the motor was disconnected from the power supply is determined at 354(6) as an indication of the amount of time the back emf has been decaying. From this value, a determination is made at 354(7) as to whether the period of decay has exceeded a given time limit, i.e. 0.5 seconds. If not 354(7), 354(8), the subroutine loops back to reading the sign of back emf voltage at 354(2). If the time from disconnection from the power supply exceeds the given time limit 354(7), 354(9), it is deemed that the back emf has decayed and the conditions are appropriate for the windings to be reconnected to the power supply.

If at 354(3) there has been a sign change 354(10) indicating a zero crossing, the start/stop buttons are monitored with no debounce delay at 354(11). If the stop button has been selected, the contactors remain open and the motor is allowed to shut-down 354(12). If the stop button is not selected, the time of the back emf voltage zero crossing is measured or otherwise determined and the phase difference from the last supply voltage zero crossing is determined 354(13). Therefore, the process determines the time when the back emf will come into phase with the power supply 354(14). Thereafter, the time at which the designated first contactor must close and time remaining to initiate closing 354(15) is determined. If the time to begin closing of the first designated contactor is after the next back emf zero crossing 354(16), 354(17), the back emf will not yet be in phase and the process re-loops back to step 354(2). On the other hand, if time to begin closing of the first designated contactor is before the next emf zero crossing 354(16), 354(18), the back emf will be in phase with the supply voltage. Accordingly, the Wait for Back Emf subroutine returns a change to delta command at 354(19) indicating that either back emf has decayed or that the phase of the back emf and the supply are in sync with one another.

The change to delta command passes motor control to a Reconnect to Motor in Delta routine 364. For purposes of illustration, the reconnection of the motor windings in a delta will be described with respect to a delta configuration wherein the poles are within the delta. As set forth in FIG. 33, the reconnection of the motor windings to the power supply, after sufficient back emf decay or synchronization between the phases of the back emd and supply voltage, continues with a timing strategy for asynchronous closure of the contactors 366. In one embodiment, the designated first contactor is controlled to close at sixty degrees after a zero crossing of the specified line voltage. Accordingly, at 368, the designated first contactor is energized for subsequent closure. The second and third contactors are then energized 370 so as to close simultaneously after the closure of the first contactor. In one embodiment, the second and third contactors will close after ninety degrees in phase shift of the specified line voltage after closure of the first contactor. At 372, the timing of the first contactor closure is observed and the timing of the designated first closure is stored in memory for subsequent motor control. Closure of the second and third contactors, preferably ninety degrees in phase after closure of the designated first contactor, occurs simultaneously, and is observed at 374 and 376. The difference between when closure was initiated and actual closure is recorded for the contactors and stored in accessible memory for subsequent contactor closure control. That is, a history is created of the lag times between contactor closure initiation and actual contactor closure.

Following closure of the contactors, the phase connection test subroutine 280 is carried out to confirm that the phases of the voltages across the windings are acceptable. If so, motor operation continues with the windings arranged in a delta configuration 378, which is preferred when the motor is operating at its normal, rated speed.

Figure 34:
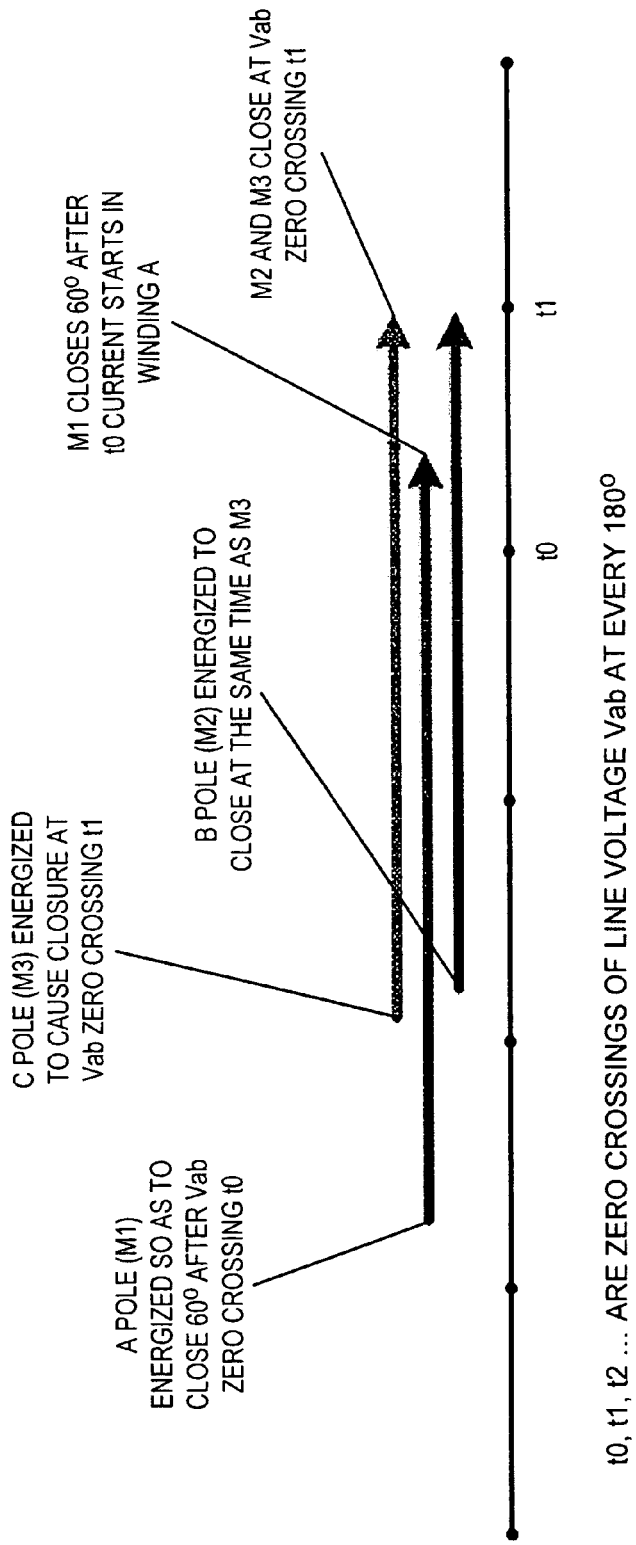
FIG. 34 is a timing diagram illustrating non-simultaneous contactor closure to connect windings of a motor in a delta configuration in accordance with another aspect of the invention.

The timing of the closure of the contactors for reconnection of the windings in a delta configuration is illustrated in the timing diagram of FIG. 34 relative to the delta configuration of FIG. 15. As shown, the designated first pole or contactor M1 is energized to close sixty degrees after a zero crossing of the designated line voltage, $V_{ab}$. The second and third contactors M2 and M3 are energized so as to close at the same time. When the designated first pole contactor M1 is closed, current begins to flow through winding A. However, current will not begin to flow through windings B and C until contactors M2 and M3 are closed. Contactors M2 and M3 are preferably caused to close after contactor M1 and at the next zero crossing of the line voltage $V_{ab}$ or 120 degrees after M1 closes.

Figure 35:
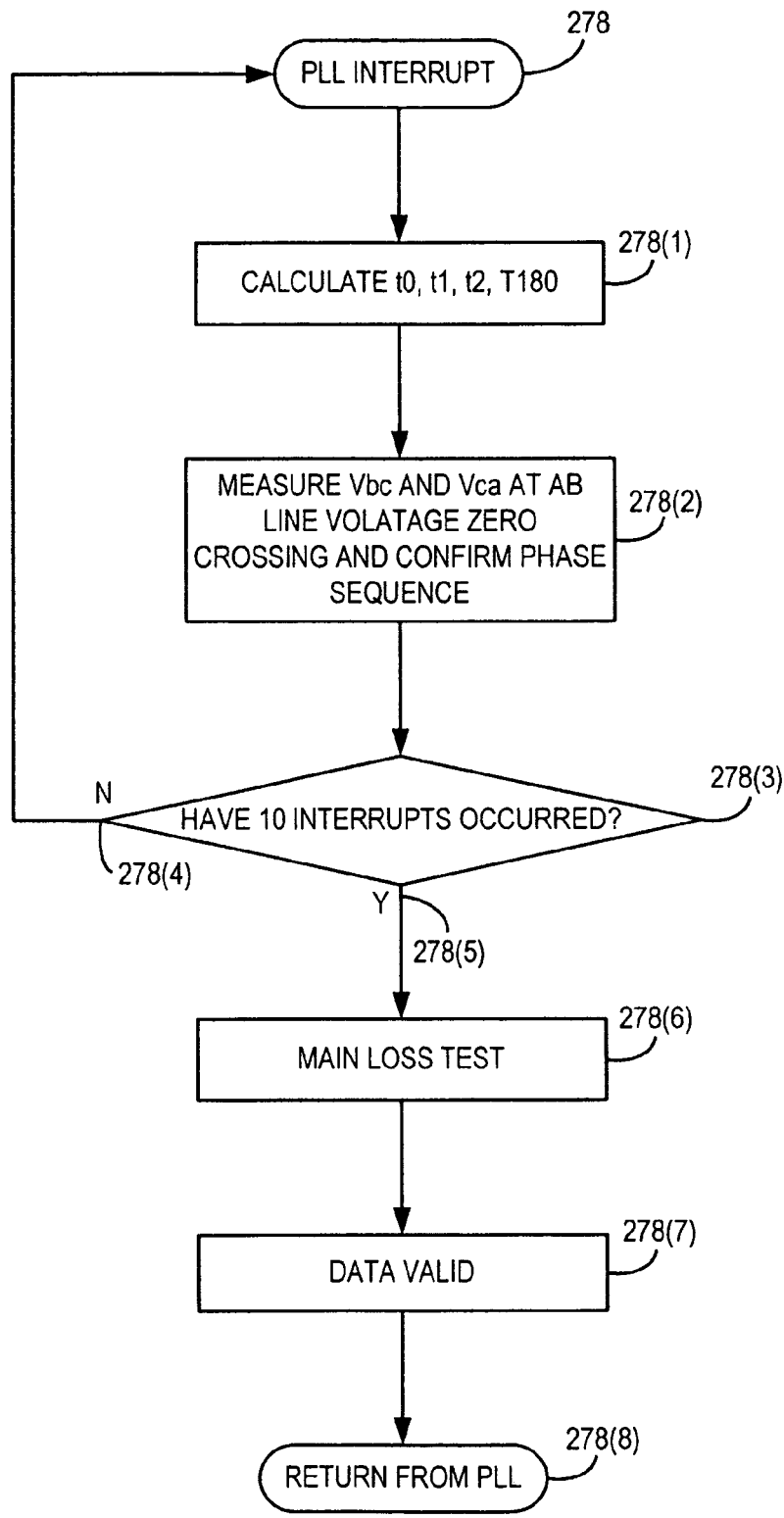
FIG. 35 sets forth the steps of a PLL interrupt that is carried out with zero crossing of a specified line voltage.

As noted above, the motor control process also includes a PLL interrupt that controls timing of the motor control as shown in FIG. 35. The PLL interrupt 278 is locked to positive going zero crossings of a specified line voltage, which occur every 360 degrees in phase change at times t0, t2, t4, etc. The interrupt 278 is triggered when the line voltage crosses zero at time t0. Once triggered, the interrupt determines timing of subsequent zero crossings at t1, t2, and T180 at 278(1). Therefrom, the interrupt determines the voltage across the other line voltages when the voltage across the specified line voltage crosses zero 278(2). More particularly, a phase rotation sequence is determined by measuring the other line voltages at the zero crossing of the specified line voltage. The other line voltages should be equal to 0.86 of the peak line voltage, but have opposite sign. That is: if Vbc=+Vpk/2 and Vca=−Vpk/2, the supply rotation sequence is ABC. On the other hand, if Vbc=−Vpk/2 and Vca=+Vpk/2, the sequence is in reverse, ACB. The phase sequence is then used to determine which contactor will be the first designated contactor to close and which will be the second and third designated contactors to close. If the sequence is reversed, the motor can be prevented from starting.

The interrupt then determines if ten interrupts have occurred 278(3). If not 278(3), 278(4), the interrupt loops back to determination of voltage zero crossings at 278(1). If ten interrupts have occurred 278(3), 278(5), a mains lost test is undertaken at 278(6). If a mains loss occurs, motor back emf is seen at the motor terminals. This can be determined by a decay of the line voltages and an increase in the time needed for 360 degrees in phase rotation of the specified line voltage. As the motor slows down, this can be detected by an immediate large increase in the zero crossing time error, i.e. larger than expected time interval for the next zero crossing of the specified line voltage.

The interrupt 278, from the determined line voltages and phase sequences, then determines if the data is valid 278(7). Specifically, the interrupt verifies that the zero crossings are occurring every 180 degrees in phase change of the specified line voltage. The interrupt also verifies that the phase sequence is acceptable. If a disconnection from the power supply is determined based on errors in expected timing of zero crossings, the appropriate outputs are provided. In all, the PLL interrupt provides an output 278(8) to control the timing of acts achieved by the routines and subroutines described hereabove.

The present invention has been described with respect to designated first pole switching wherein the contactor for one pole or phase of a three-phase input or load is opened or closed before the remaining contactors are opened or closed. An advantage of this construction is that any contactor may be designated the "first" pole contactor. Further, this designation can be selectively changed such that the "first" pole designation is rotated among all the contactors. Rotating the "first" pole designation between the contactor evens out contact erosion between the contactors thereby achieving constant and consistent operation of the contactors. The rotation designation can be automatically done by programming the controller to change designation after a specified number of makes and break events or manually by changing the order the lead wires are connected to the contactor assembly.

Figure 36:
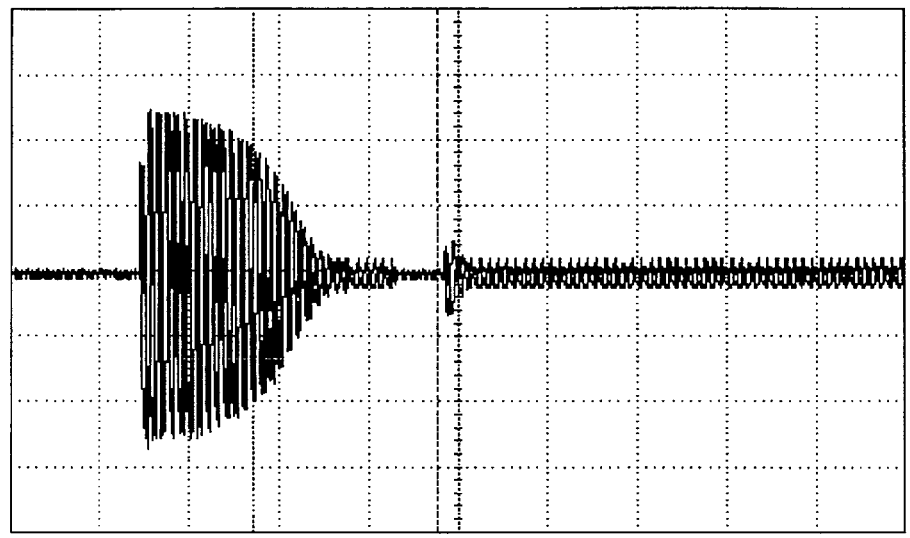
FIG. 36 illustrates transient currents resulting from asynchronous contactor closure with supply voltage and back emf in phase with one another according to another aspect of the present invention.
Figure 37:
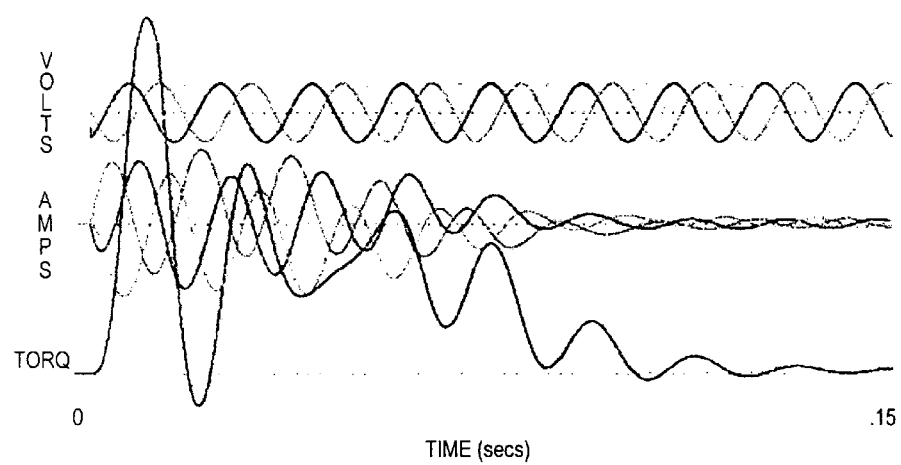
FIG. 37 illustrates voltage, current, and resulting torque pulsation amplitude over time for starting of an exemplary motor with simultaneous closure of contactor poles in a delta configuration.

The present invention includes a multi-stage contactor closure strategy for star/wye-delta transitions that takes into account back emf to further reduce torque oscillations, transient currents, and, ultimately, mechanical stresses. The effects of allowing emf to be in phase with the system voltage coupled with a two-stage contactor closure for a wye-delta start are illustrated in FIG. 36. One skilled in the art will appreciate that torque pulsation is further reduced following delta reconnection, and negative torque is virtually eliminated when compared to the previous approach illustrated in FIG. 39.

Therefore, in one embodiment, a method of controlling operation of an electric device is provided and includes the steps of monitoring a voltage output of an electric load recently disconnected from a power supply and determining when a characteristic of the voltage output reaches a given value. The method further includes that upon the characteristic of the voltage output reaching the given value, asynchronously switching a number of contactors to reconnect the electric load to the power supply.

In another embodiment, the present invention includes a controller to control operation of an electric power system. The controller is programmed to transmit a first contactor close signal to a first set of contactors to connect windings of a polyphase electric power system in a wye circuit configuration. The controller is also programmed to monitor a first output of the polyphase power system, and when the first output attains a first given value, transmit a contactor open signal to the first set of contactors to form an open circuit condition to disconnect the windings of the polyphase electric power system from the power supply. The controller is further programmed to monitor a second output of the polyphase power system during the open circuit condition, and when the second output attains a second given value, transmit a second contactor close signal to a second set of contactors to non-simultaneously close the second set of contactors to connect the windings a delta circuit configuration.

According to another embodiment, a system to control operation of a polyphase electric motor is provided. The system includes a first set of contactors and a second set of contactors. Both sets of contactors are electrically connected between a voltage supply and windings of a polyphase electric motor. The system also has a controller configured to asynchronously close the first set of contactors to electrically connect the windings in a wye configuration during a first mode of motor operation and asynchronously close the second set of contactors to electrically connect the winding in a delta configuration during a second mode of motor operation different from the first mode of motor operation.

The present invention has been described in terms of the preferred embodiment, and it is recognized that equivalents, alternatives, and modifications, aside from those expressly stated, are possible and within the scope of the appending claims.

What is claimed is:

1. A method of controlling operation of an electric device comprising the steps of:
   monitoring a voltage output of an electric load recently disconnected from a power supply;
   determining when a characteristic of the voltage output reaches a given value; and
   upon the characteristic of the voltage output reaching the given value, asynchronously switching a number of contactors to reconnect the electric load to the power supply.

2. The method of claim 1 wherein the electric load is a polyphase electric motor, and further comprising the step of asynchronously closing the number of contactors such that windings of the polyphase electric motor are arranged in a delta configuration.

3. The method of claim 2 wherein the polyphase electric motor is a three-phase electric motor.

4. The method of claim 1 wherein the characteristic of the voltage output is a phase of the voltage output of the recently disconnected electric load, and further comprising the step of comparing the phase of the voltage output to a phase of a voltage output of the power supply.

5. The method of claim 4 further comprising the step of initiating the step of asynchronously switching the number of contactors at at least a near in-phase moment when the phase of the voltage output of the electric load and the phase of the voltage output of the power supply are at least approximately in-phase with one another.

6. The method of claim 5 further comprising the step of switching a first contactor of the number of contactors at a given moment after the near in-phase moment and switching any other contactors of the number of contactors after switching of the first contactor.

7. The method of claim 6 further comprising the step of switching the first contactor after sixty degrees after zero crossing of the voltage output of the power supply after the near in-phase moment.

8. The method of claim 6 further comprising the step of switching the any other contactors of the number of contactors simultaneously.

9. The method of claim 8 further comprising the step of switching the any other contactors after ninety degrees in phase change of the phase of the voltage output of the power supply after switching of the first contactor.

10. The method of claim 1 wherein the electric load includes a motor, and further comprising the step of disconnecting the electric motor from the power supply when the speed of the electric motor reaches a given threshold or when motor current reaches a given amplitude.

11. The method of claim 1 configured to reduce torque oscillations and current transients when transitioning an electric load from a wye configuration-based operation to a delta configuration-based operation.

12. A controller to control operation of an electric power system, the controller programmed to:
   transmit a first contactor close signal to a first set of contactors to connect windings of a polyphase electric power system in a wye circuit configuration;
   monitor a first output of the polyphase power system, and when the first output attains a first given value, transmit a contactor open signal to the first set of contactors to open the first set of contactors asynchronously to disconnect the windings of the polyphase electric power system from a power supply; and
   monitor a second output of the polyphase power system during the open circuit condition, and when the second output attains a second given value, transmit a second contactor close signal to a second set of contactors to non-simultaneously close the second set of contactors to connect the windings a delta circuit configuration.

13. The controller of claim 12 wherein the second set of contactors is different from the first set of contactors.

14. The controller of claim 12 further programmed to transmit the second contactor close signal to the second set of contactors such that a first contactor of the second set of contactors is closed ninety degrees in phase of a power supply voltage before at least a second contactor of the second set of contactors.

15. The controller of claim 14 further programmed to cause simultaneous closure of all but the first contactor of the second set of contactors after closure of the first contactor.

16. The controller of claim 12 wherein the second output is defined by a phase of a voltage output by the polyphase power system during the open circuit condition, and further programmed to transmit the second contactor close signal when the phase of the voltage output by the polyphase power system is in-phase with a phase of a voltage of the power supply.

17. The controller of claim 12 wherein the polyphase power system is an electric motor and the first output is defined by one of motor speed and motor current amplitude.

18. The controller of claim 12 further programmed to cause two contactors of the first set of contactors to close before closing of other contactors of the first set of contactors to connect the windings in the wye circuit configuration.

19. The controller of claim 18 further programmed to cause the two contactors of the first set of contactors to close when phase of a voltage across a winding is at an approximate across the winding peak and cause the other contactors of the first set of contactors to close when the phase is at approximately zero.

20. A system to control operation of a polyphase electric motor, the system comprising:
   a first set of contactors and a second set of contactors, both sets of contactors electrically connected between a voltage supply and windings of a polyphase electric motor; and
   a controller configured to asynchronously close the first set of contactors to electrically connect the windings in a wye configuration during a first mode of motor operation and asynchronously close the second set of contactors to electrically connect the windings in a delta configuration during a second mode of motor operation different from the first mode of motor operation.

21. The system of claim 20 wherein the polyphase electric motor is a three-phase electric motor, and wherein the controller is configured to close two contactors of the first set of contactors when voltage across a winding is at a peak and close a third contactor of the first set of contactors when voltage across the winding is at or near a following zero.

22. The system of claim 20 wherein the polyphase electric motor is a three-phase electric motor, and wherein the controller is configured to close a first contactor of the second set of contactors when voltage across a winding is at or near 60 degrees and close other contactors of the second set of contactors when voltage across the winding is 120 degrees out-of-phase from that at closing of the first contactor of the second set of contactors.

23. The system of claim 20 wherein the first mode of operation includes motor start-up.

24. The system of claim 20 wherein the first mode of operation is defined by low voltage and low current motor operation and the second mode of operation is defined by high current and high voltage motor operation.

25. The system of claim 20 wherein the first set of contactors is different from the second set of contactors, and both sets of contactors are housed within a motor starter.

* * * * *